US010955929B2

(12) United States Patent
Ravasz et al.

(10) Patent No.: US 10,955,929 B2
(45) Date of Patent: Mar. 23, 2021

(54) ARTIFICIAL REALITY SYSTEM HAVING A DIGIT-MAPPED SELF-HAPTIC INPUT METHOD

(71) Applicant: Facebook Technologies, LLC, Menlo Park, CA (US)

(72) Inventors: Jonathan Ravasz, London (GB); Jasper Stevens, London (GB); Adam Tibor Varga, London (GB); Etienne Pinchon, London (GB); Simon Charles Tickner, Canterbury (GB); Jennifer Lynn Spurlock, Seattle, WA (US); Kyle Eric Sorge-Toomey, Seattle, WA (US); Robert Ellis, London (GB); Barrett Fox, Berkeley, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/435,139

(22) Filed: Jun. 7, 2019

(65) Prior Publication Data

US 2020/0387229 A1 Dec. 10, 2020

(51) Int. Cl.
*G06F 3/01* (2006.01)
*G06T 19/00* (2011.01)
*G06F 3/0484* (2013.01)
*G06F 3/0485* (2013.01)
*G02B 27/01* (2006.01)

(52) U.S. Cl.
CPC ........... *G06F 3/017* (2013.01); *G02B 27/017* (2013.01); *G06F 3/0485* (2013.01); *G06F 3/04845* (2013.01); *G06T 19/006* (2013.01)

(58) Field of Classification Search
CPC .................................................. G06T 19/006
See application file for complete search history.

(56) References Cited

U.S. PATENT DOCUMENTS 8,902,198 B1 12/2014 Karakotsios et al.
10,139,906 B1 * 11/2018 Bai ..................... G06F 3/03547
(Continued)

FOREIGN PATENT DOCUMENTS

WO 2019/004686 A1 1/2019

OTHER PUBLICATIONS

U.S. Appl. No. 16/435,133, filed Jun. 7, 2019, by Ravasz et al.
International Search Report and Written Opinion of International Application No. PCT/US2020/036580, dated Sep. 7, 2020, 13 pp.

*Primary Examiner* — Phi Hoang
(74) *Attorney, Agent, or Firm* — Shumaker & Sieffert, P.A.

(57) ABSTRACT

An artificial reality system is described that renders, presents, and controls user interface elements within an artificial reality environment, and performs actions in response to one or more detected gestures of the user. The artificial reality system captures image data representative of a physical environment and outputs the artificial reality content. The artificial reality system identifies, from the image data, a gesture comprising a motion of a first digit of a hand and a second digit of the hand to form a pinching configuration a particular number of times within a threshold amount of time. The artificial reality system assigns one or more input characters to one or more of a plurality of digits of the hand and processes a selection of a first input character of the one or more input characters assigned to the second digit of the hand in response to the identified gesture.

18 Claims, 13 Drawing Sheets

(56) References Cited

U.S. PATENT DOCUMENTS

| | | |
|---|---|---|
| 2011/0316784 A1 | 12/2011 | Bisutti et al. |
| 2012/0050155 A1 | 3/2012 | Watanabe et al. |
| 2012/0206363 A1 | 8/2012 | Kyprianou et al. |
| 2012/0306740 A1* | 12/2012 | Hoda ............... G06F 3/017 345/156 |
| 2013/0050061 A1 | 2/2013 | Ueno et al. |
| 2013/0249944 A1* | 9/2013 | Raghoebardayal ... G06T 19/006 345/633 |
| 2014/0267044 A1* | 9/2014 | Andersen ........... G06F 3/04886 345/168 |
| 2015/0029111 A1* | 1/2015 | Trachte ............... G06F 3/02 345/173 |
| 2015/0062006 A1 | 3/2015 | Karakotsios et al. |
| 2015/0261429 A1* | 9/2015 | Ghassabian ......... G06F 3/167 715/773 |
| 2015/0277848 A1 | 10/2015 | Grothe et al. |
| 2016/0004300 A1* | 1/2016 | Baic ................... G06F 3/017 345/419 |
| 2016/0110069 A1 | 4/2016 | Tanoue |
| 2017/0278306 A1 | 9/2017 | Rico |
| 2018/0224980 A1 | 8/2018 | Avila et al. |
| 2018/0329209 A1 | 11/2018 | Nattukallingal |
| 2019/0182415 A1* | 6/2019 | Sivan ................ G06F 3/013 |
| 2020/0019763 A1* | 1/2020 | Iyer ................... G06F 3/011 |
| 2020/0117282 A1 | 4/2020 | Lee et al. |

* cited by examiner

ARTIFICIAL REALITY SYSTEM HAVING A DIGIT-MAPPED SELF-HAPTIC INPUT METHOD

TECHNICAL FIELD

This disclosure generally relates to artificial reality systems, such as virtual reality, mixed reality and/or augmented reality systems, and more particularly, to user interfaces of artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). During operation, the user typically interacts with the artificial reality system to select content, launch applications or otherwise configure the system.

SUMMARY

In general, this disclosure describes artificial reality systems and, more specifically, graphical user interface elements and techniques for presenting and controlling the user interface elements within an artificial reality environment.

For example, artificial reality systems are described that generate and render graphical user interface elements for display to a user in response to detection of one or more pre-defined gestures by the user, such as particular motions, configurations, positions, and/or orientations of the user's hands, fingers, thumbs or arms, or a combination of pre-defined gestures. In some examples, the artificial reality system may further trigger generation and rendering of the graphical user interface elements in response to detection of particular gestures in combination with other conditions, such as the position and orientation of the particular gestures in a physical environment relative to a current field of view of the user, which may be determined by real-time gaze tracking of the user, or relative to a pose of an HMD worn by the user.

In some examples, the artificial reality system may generate and present the graphical user interface elements as overlay elements with respect to the artificial reality content currently being rendered within the display of the artificial reality system. The graphical user interface elements may, for example, be a graphical user interface, such as a menu or sub-menu with which the user interacts to operate the artificial reality system, or individual graphical user interface elements selectable and manipulatable by a user, such as toggle elements, drop-down elements, menu selection elements, two-dimensional or three-dimensional shapes, graphical input keys or keyboards, content display windows and the like.

In accordance with the techniques described herein, the artificial reality system generates and presents various graphical user interface elements with which the user interacts to input text and other input characters. In one example, the artificial reality system renders and outputs a virtual keyboard as an overlay element to other artificial reality content output by an HMD. The artificial reality system captures image data of a hand as it moves within a physical environment, and tracks the location of the hand with respect to a location of the rendered virtual keyboard in the artificial reality space. Specifically, the artificial reality system tracks the location of at least two digits of the hand, e.g., a thumb and an index finger of the hand. The artificial reality system detects a gesture comprising a motion of the two digits coming together to form a pinching configuration, and maps a location of a point of contact between the two digits while in the pinching configuration to a virtual key of the virtual keyboard. Once the artificial reality system detects the gesture, the artificial reality system receives the selection of the particular virtual key as user input comprising an input character assigned to the particular virtual key.

In another example, rather than rendering and outputting a virtual keyboard, the artificial reality system assigns one or more input characters to one or more digits of a hand detected in the image data captured by the artificial reality system. In this example, the artificial reality system may leave at least one digit of the hand without assigned input characters to act as an input selection digit. The artificial reality system detects a gesture comprising a motion of the input selection digit forming a pinching configuration with a particular one of the other digits having assigned input characters a particular number of times within a threshold amount of time. As the number of times the motion of forming the pinching configuration is detected increases, the artificial reality system cycles through the one or more input characters assigned to the particular digit. The artificial reality system determines the selection of a particular one of the input characters based on the number of times the motion of forming the pinching configuration is detected and a selection number mapped to the particular input character. The artificial reality system receives the selection of the particular input character assigned to the particular digit as user input.

In many artificial reality systems, users may be required to hold additional pieces of hardware in their hands in order to provide user input to the artificial reality system, which may decrease the accessibility for users with various disabilities and provide an awkward or unnatural interface for the user. In artificial reality systems in which users do not hold additional hardware pieces, it may be difficult to accurately detect user input in an intuitive and reliable manner. Further, the artificial reality systems that do not require the additional hardware pieces may be unable to provide useful feedback to the user as to when and how particular user interface elements are selected for input to the artificial reality system. By utilizing the techniques described herein, the artificial reality system may provide a natural input system that uses self-haptic feedback, or the feeling of the user's own digits coming into contact when forming the pinching configuration, to indicate to the user when a selection has been made. Furthermore, by detecting a gesture comprising the motion of forming the specific pinching configuration, the artificial reality system may efficiently determine when to analyze the image data to determine which input character is received as the user input. The techniques described herein may reduce or even eliminate the need for users to hold additional hardware pieces in order to provide user input, thereby increasing the overall efficiency of the system, reducing processing of communications between separate components of the artificial reality system, and increasing accessibility of artificial reality systems for users of all levels of physical ability.

In one example of the techniques described herein, an artificial reality system includes an image capture device configured to capture image data representative of a physical environment. The artificial reality system further includes a HMD configured to output artificial reality content. The artificial reality system also includes a rendering engine configured to render a virtual keyboard with a plurality of virtual keys as an overlay to the artificial reality content. The artificial reality system further includes a gesture detector configured to identify, from the image data, a gesture comprising a motion of a first digit of a hand and a second digit of the hand to form a pinching configuration, wherein a point of contact between the first digit and the second digit while in the pinching configuration corresponds to a location of a first virtual key of the plurality of virtual keys of the virtual keyboard. The artificial reality system also includes a user interface engine configured to process a selection of the first virtual key in response to the identified gesture.

In another example of the techniques described herein, a method includes capturing, by an image capture device of an artificial reality system, image data representative of a physical environment. The method further includes rendering artificial reality content and a virtual keyboard with a plurality of virtual keys as an overlay to the artificial reality content. The method also includes outputting, by a HMD of the artificial reality system, the artificial reality content and the virtual keyboard. The method further includes identifying, from the image data, a gesture comprising a motion of a first digit of a hand and a second digit of the hand to form a pinching configuration, wherein a point of contact between the first digit and the second digit while in the pinching configuration corresponds to a location of a first virtual key of the plurality of virtual keys of the virtual keyboard. The method also includes processing a selection of the first virtual key in response to the identified gesture.

In another example of the techniques described herein, a non-transitory, computer-readable medium includes instructions that, when executed, cause one or more processors of an artificial reality system to capture image data representative of a physical environment. The instructions further cause the one or more processors to render artificial reality content and a virtual keyboard with a plurality of virtual keys as an overlay to the artificial reality content. The instructions also cause the one or more processors to output the artificial reality content and the virtual keyboard. The instructions further cause the one or more processors to identify, from the image data, a gesture comprising a motion of a first digit of a hand and a second digit of the hand to form a pinching configuration, wherein a point of contact between the first digit and the second digit while in the pinching configuration corresponds to a location of a first virtual key of the plurality of virtual keys of the virtual keyboard. The instructions also cause the one or more processors to process a selection of the first virtual key in response to the identified gesture.

In another example of the techniques described herein, an artificial reality system includes an image capture device configured to capture image data representative of a physical environment. The artificial reality system further includes a HMD configured to output artificial reality content. The artificial reality system also includes a gesture detector configured to identify, from the image data, a gesture comprising a motion of a first digit of a hand and a second digit of the hand to form a pinching configuration a particular number of times within a threshold amount of time. The artificial reality system further includes a user interface engine configured to assign one or more input characters to one or more of a plurality of digits of the hand and process a selection of a first input character of the one or more input characters assigned to the second digit of the hand in response to the identified gesture.

In another example of the techniques described herein, a method includes capturing, by an image capture device of an artificial reality system, image data representative of a physical environment. The method further includes outputting, by a HMD of the artificial reality system, artificial reality content. The method also includes identifying, from the image data, a gesture comprising a motion of a first digit of a hand and a second digit of the hand to form a pinching configuration a particular number of times within a threshold amount of time. The method further includes assigning one or more input characters to one or more of a plurality of digits of the hand. The method also includes processing a selection of a first input character of the one or more input characters assigned to the second digit of the hand in response to the identified gesture.

In another example of the techniques described herein, a non-transitory, computer-readable medium includes instructions that, when executed, cause one or more processors of an artificial reality system to capture image data representative of a physical environment. The instructions further cause the one or more processors to output artificial reality content. The instructions also cause the one or more processors to identify, from the image data, a gesture comprising a motion of a first digit of a hand and a second digit of the hand to form a pinching configuration a particular number of times within a threshold amount of time. The instructions further cause the one or more processors to assign one or more input characters to one or more of a plurality of digits of the hand. The instructions also cause the one or more processors to process a selection of a first input character of the one or more input characters assigned to the second digit of the hand in response to the identified gesture.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
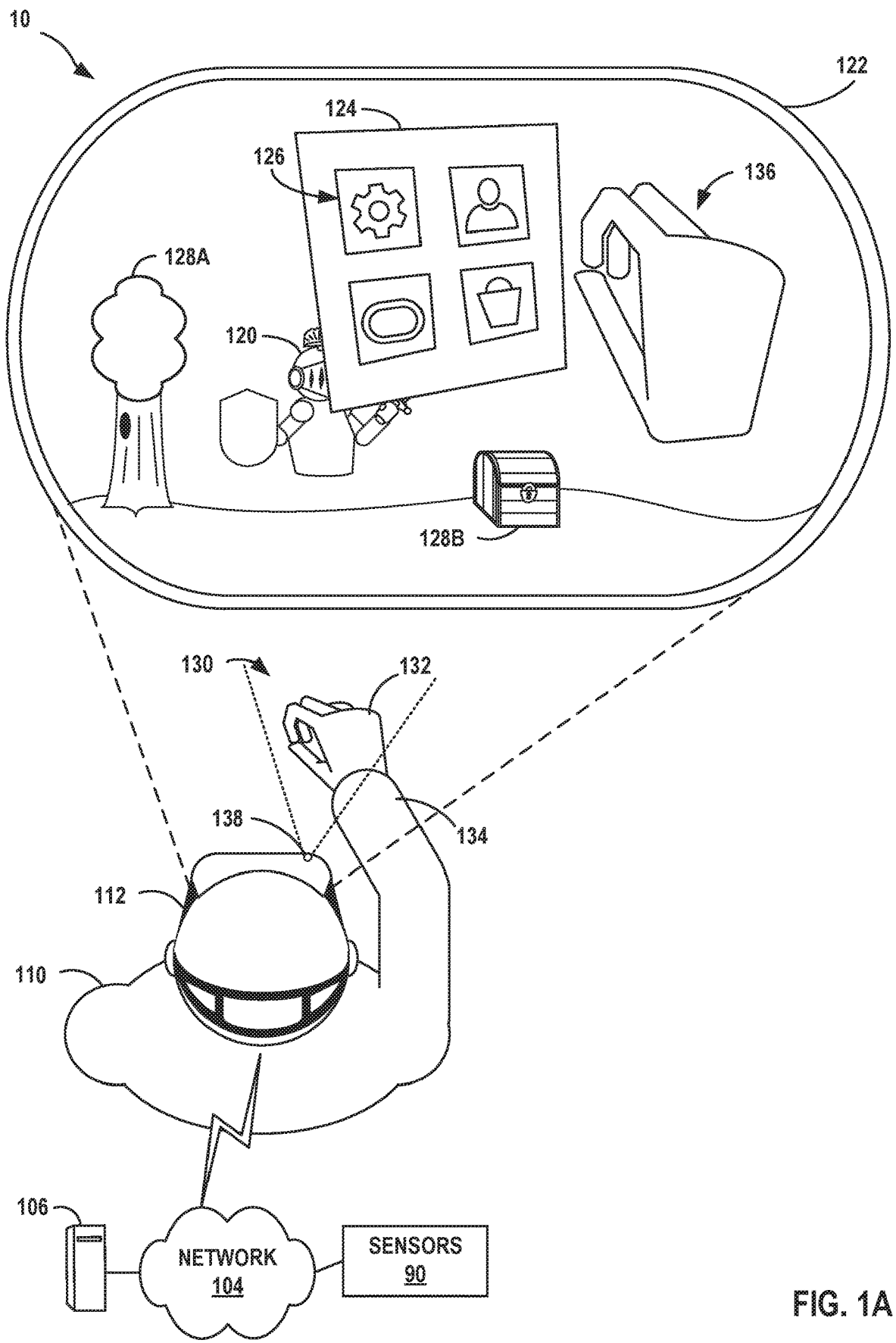
FIG. 1A is an illustration depicting an example artificial reality system that presents and controls user interface elements within an artificial reality environment in accordance with the techniques of the disclosure.

FIG. 1A is an illustration depicting an example artificial reality system 10 that presents and controls user interface elements within an artificial reality environment in accordance with the techniques of the disclosure. In some example implementations, artificial reality system 10 generates and renders graphical user interface elements to a user 110 in response to one or more detected gestures performed by user 110. That is, as described herein, artificial reality system 10 presents one or more graphical user interface elements 124, 126 in response to detecting one or more particular gestures performed by user 110, such as particular motions, configurations, locations, and/or orientations of the user's hands, fingers, thumbs or arms. In other examples, artificial reality system 10 presents and controls user interface elements specifically designed for user interaction and manipulation within an artificial reality environment, such as specialized toggle elements, drop-down elements, menu selection elements, graphical input keys or keyboards, content display windows and the like.

In the example of FIG. 1A, artificial reality system 10 includes head mounted device (HMD) 112, console 106 and, in some examples, one or more external sensors 90. As shown, HMD 112 is typically worn by user 110 and includes an electronic display and optical assembly for presenting artificial reality content 122 to user 110. In addition, HMD 112 includes one or more sensors (e.g., accelerometers) for tracking motion of the HMD and may include one or more image capture devices 138, e.g., cameras, line scanners and the like, for capturing image data of the surrounding physical environment. In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. As one example, artificial reality content 122 may be a consumer gaming application in which user 110 is rendered as avatar 120 with one or more virtual objects 128A, 128B. In some examples, artificial reality content 122 may comprise a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Moreover, in accordance with the techniques of this disclosure, based on the sensed data, the artificial reality application detects gestures performed by user 110 and, in response to detecting one or more particular gestures, generates one or more user interface elements, e.g., UI menu 124 and UI element 126, which may be overlaid on underlying artificial reality content 122 being presented to the user. In this respect, user interface elements 124, 126 may be viewed as part of the artificial reality content 122 being presented to the user in the artificial reality environment. In this way, artificial reality system 10 dynamically presents one or more graphical user interface elements 124, 126 in response to detecting one or more particular gestures by user 110, such as particular motions, configurations, positions, and/or orientations of the user's hands, fingers, thumbs or arms. Example configurations of a user's hand may include a fist, one or more digits extended, the relative and/or absolute positions and orientations of one or more of the individual digits of the hand, the shape of the palm of the hand, and so forth. The user interface elements may, for example, be a graphical user interface, such as a menu or sub-menu with which user 110 interacts to operate the artificial reality system, or individual user interface elements selectable and manipulatable by user 110, such as toggle elements, drop-down elements, menu selection elements, two-dimensional or three-dimensional shapes, graphical input keys or keyboards, content display windows and the like. While depicted as a two-dimensional element, for example, UI element 126 may be a two-dimensional or three-dimensional shape that is manipulatable by a user performing gestures to translate, scale, and/or rotate the shape in the artificial reality environment.

In the example of FIG. 1A, graphical user interface element 124 may be a window or application container that includes graphical user interface elements 126, which may include one or more selectable icons that perform various functions. In other examples, artificial reality system 10 may present a virtual keyboard, such as a QWERTY keyboard, an AZERTY keyboard, a QWERTZ keyboard, a Dvorak keyboard, a Colemak keyboard, a Maltron keyboard, a JCUKEN keyboard, an alphabetical keyboard, a number/symbol keyboard, an emoticon selection keyboard, a split version of any of the above keyboards, any other arrangement of input characters in a keyboard format, or a depiction of a custom mapping or assignment of input characters to one or more items in artificial reality content 122, such as a rendering of the digits on hand 132 of user 110.

Moreover, as described herein, in some examples, artificial reality system 10 may trigger generation and rendering of graphical user interface elements 124, 126 in response to other conditions, such as a current state of one or more applications being executed by the system, or the position and orientation of the particular detected gestures in a physical environment in relation to a current field of view 130 of user 110, as may be determined by real-time gaze tracking of the user, or other conditions.

More specifically, as further described herein, image capture devices 138 of HMD 112 capture image data representative of objects in the real world, physical environment that are within a field of view 130 of image capture devices 138. Field of view 130 typically corresponds with the viewing perspective of HMD 112. In some examples, such as the illustrated example of FIG. 1A, the artificial reality application renders the portions of hand 132 of user 110 that are within field of view 130 as a virtual hand 136 within artificial reality content 122. In other examples, the artificial reality application may present a real-world image of hand 132 and/or arm 134 of user 110 within artificial reality content 122 comprising mixed reality and/or augmented reality. In either example, user 110 is able to view the portions of their hand 132 and/or arm 134 that are within field of view 130 as objects within artificial reality content 122. In other examples, the artificial reality application may not render hand 132 or arm 134 of the user at all.

In any case, during operation, artificial reality system 10 performs object recognition within image data captured by image capture devices 138 of HMD 112 to identify hand 132, including optionally identifying individual fingers or the thumb, and/or all or portions of arm 134 of user 110. Further, artificial reality system 10 tracks the position, orientation, and configuration of hand 132 (optionally including particular digits of the hand) and/or portions of arm 134 over a sliding window of time. The artificial reality application analyzes any tracked motions, configurations, positions, and/or orientations of hand 132 and/or portions of arm 134 to identify one or more gestures performed by particular objects, e.g., hand 132 (including particular digits of the hand) and/or portions of arm 134 of user 110. To detect the gesture(s), the artificial reality application may compare the motions, configurations, positions and/or orientations of hand 132 and/or portions of arm 134 to gesture definitions stored in a gesture library of artificial reality system 10, where each gesture in the gesture library may be mapped to one or more actions. In some examples, detecting movement may include tracking positions of one or more of the digits (individual fingers and thumb) of hand 132, including whether any of a defined combination of the digits (such as an index finger and thumb) are brought together to touch or approximately touch in the physical environment. In other examples, detecting movement may include tracking an orientation of hand 132 (e.g., fingers pointing toward HMD 112 or away from HMD 112) and/or an orientation of arm 134 (i.e., the normal of the arm facing toward HMD 112) relative to the current pose of HMD 112. The position and orientation of hand 132 (or a portion thereof) thereof may alternatively be referred to as the pose of hand 132 (or a portion thereof).

Moreover, the artificial reality application may analyze configurations, positions, and/or orientations of hand 132 and/or arm 134 to identify a gesture that includes hand 132 and/or arm 134 being held in one or more specific configuration, positions, and/or orientations for at least a threshold period of time. As examples, one or more particular positions at which hand 132 and/or arm 134 are being held substantially stationary within field of view 130 for at least a configurable period of time may be used by artificial reality system 10 as an indication that user 110 is attempting to perform a gesture intended to trigger a desired response by the artificial reality application, such as triggering display of a particular type of user interface element 124, 126, such as a menu. As another example, one or more particular configurations of the fingers and/or palms of hand 132 and/or arm 134 being maintained within field of view 130 for at least a configurable period of time may be used by artificial reality system 10 as an indication that user 110 is attempting to perform a gesture. Although only right hand 132 and right arm 134 of user 110 are illustrated in FIG. 1A, in other examples, artificial reality system 10 may identify a left hand and/or arm of user 110 or both right and left hands and/or arms of user 110. In this way, artificial reality system 10 may detect single-handed gestures performed by either hand, double-handed gestures, or arm-based gestures within the physical environment, and generate associated user interface elements in response to the detected gestures.

In accordance with the techniques of this disclosure, the artificial reality application determines whether an identified gesture corresponds to a gesture defined by one of a plurality of entries in a gesture library of console 106 and/or HMD 112. As described in more detail below, each of the entries in the gesture library may define a different gesture as a specific motion, configuration, position, and/or orientation of a user's hand, digit (finger or thumb) and/or arm over time, or a combination of such properties. In addition, each of the defined gestures may be associated with a desired response in the form of one or more actions to be performed by the artificial reality application. As one example, one or more of the defined gestures in the gesture library may trigger the generation, transformation, and/or configuration of one or more user interface elements, e.g., UI menu 124, to be rendered and overlaid on artificial reality content 122, where the gesture may define a location and/or orientation of UI menu 124 in artificial reality content 122. As another example, one or more of the defined gestures may indicate an interaction by user 110 with a particular user interface element, e.g., selection of UI element 126 of UI menu 124, to trigger a change to the presented user interface, presentation of a sub-menu of the presented user interface, or the like.

For instance, one of the gestures stored as an entry in the gesture library may be a motion of two or more digits of a hand to form a pinching configuration. A pinching configuration may consist of any configuration where at least two separate digits of a same hand (e.g., hand 132 of user 110) come into contact with one another. In some examples, this configuration may be further limited, such as requiring that the two digits in contact with one another be separate from the remaining digits of the hand, or requiring that the portions of the digits that are in contact with one another be the pads or tips of the digits. In some instances, an additional limitation may be that the thumb of the hand be one of the digits contacting a second digit of the hand. However, the pinching configuration may have fewer restrictions, such as simply requiring any two digits, regardless of whether the two digits belong to the same hand, to come into any contact with one another.

In accordance with the techniques described herein, when artificial reality content 122 includes a virtual keyboard that is made up of one or more virtual keys, image capture devices 138 may capture image data that includes a first digit and a second digit of hand 132 moving to form a pinching configuration. Once artificial reality system 10 identifies the gesture including the motion of the digits on hand 132 to form the pinching configuration, a point of contact between the two digits while in the pinching configuration is determined and a corresponding location is identified within the virtual environment made up by artificial reality content 122. If the point of contact of the digits while in the pinching configuration corresponds to a location of a virtual key in the virtual keyboard, then artificial reality system 10 may recognize the pinching configuration, or the release of the pinching configuration, to be a selection of the virtual key. In response to receipt of this selection, artificial reality system 10 may perform an action corresponding to the selection of the virtual key, such as inputting a text character or other ASCII character into a text input field or any other function that may be assigned to keys of a keyboard in a computing system.

In other examples of the techniques described herein, image capture devices 138 may capture image data that includes user hand 132. Artificial reality system 10 may differentiate between the various digits of user hand 132 from the image data. In instances where both hands of user 110 are included in the image data, artificial reality system 10 may differentiate between the various digits of one of the hands of user 110 or both hands. Artificial reality system 10 may then assign one or more input characters to one or more of the digits of the hand (or hands) captured in the image data. Artificial reality system 10 may, in some examples, leave one digit of each hand in the image data, such as the thumb of each hand, without input characters assigned to it, instead assigning this digit as an input selection digit. Image capture devices 138 may capture image data that includes user hand 132 forming a pinching configuration with the selector digit coming into contact with one of the other digits, to which artificial reality system 10 has assigned one or more input characters. Once artificial reality system 10 detects with the gesture including the motion of these two digits to form the pinching configuration, artificial reality system 10 may monitor the image data for a particular amount of time and determine how many distinct times the pinching configuration is formed by these two digits fin the particular amount of time. For instance, the two digits forming the pinching configuration, releasing the pinching configuration, and forming the pinching configuration again within the particular amount of time would make up two distinct instances of the pinching configuration. Based on this number of distinct instances, artificial reality system 10 processes a selection of a corresponding one of the input characters assigned to the particular digit forming the pinching configuration with the selector digit.

Accordingly, the techniques of the disclosure provide specific technical improvements to the computer-related field of rendering and displaying content by an artificial reality system. For example, artificial reality systems as described herein may provide a high-quality artificial reality experience to a user, such as user 110, of the artificial reality application by generating and rendering user interface elements overlaid on the artificial reality content based on detection of intuitive, yet distinctive, gestures performed by the user.

Further, systems as described herein may be configured to detect certain gestures based on hand and arm movements that are defined to avoid tracking occlusion. Tracking occlusion may occur when one hand of the user at least partially overlaps the other hand, making it difficult to accurately track the individual digits (fingers and thumb) on each hand, as well as the position and orientation of each hand. Systems as described herein, therefore, may be configured to primarily detect single-handed or single arm-based gestures. The use of single-handed or single arm-based gestures may further provide enhanced accessibility to users having large- and fine-motor skill limitations. Furthermore, systems as described herein may be configured to detect double-handed or double arm-based gestures in which the hands of the user do not interact or overlap with each other.

In addition, systems as described herein may be configured to detect gestures that provide self-haptic feedback to the user. For example, a thumb and one or more fingers on each hand of the user may touch or approximately touch in the physical world as part of a pre-defined gesture indicating an interaction with a particular user interface element in the artificial reality content. The touch between the thumb and one or more fingers of the user's hand may provide the user with a simulation of the sensation felt by the user when interacting directly with a physical user input object, such as a button on a physical keyboard or other physical input device.

By utilizing the techniques described herein, artificial reality system 10 may provide a natural input system that uses self-haptic feedback, or the feeling of the digits of user hand 132 coming into contact with one another when forming the pinching configuration, to indicate when an input character selection has been made. Furthermore, by detecting a gesture comprising the motion of forming the specific pinching formation, artificial reality system 10 may efficiently determine when to analyze the image data to determine which input character is received as the user input. The techniques described herein may reduce or even eliminate the need for additional hardware pieces held by user 110 to receive user input, thereby increasing the overall efficiency of artificial reality system 10, reducing processing of communications between separate components of artificial reality system 10, and increasing accessibility of artificial reality system 10 for users of all levels of physical ability.

Figure 1B:
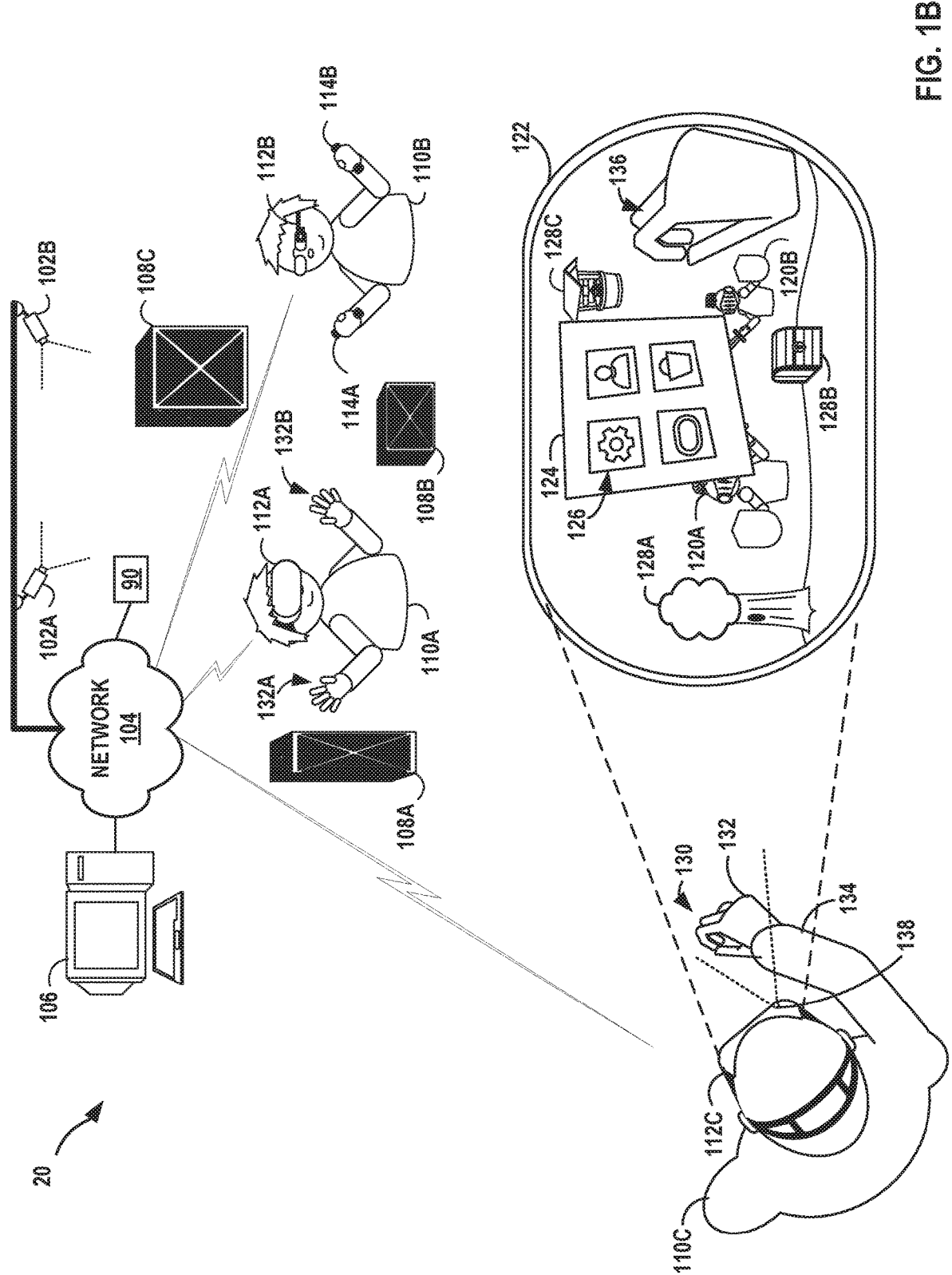
FIG. 1B is an illustration depicting another example artificial reality system in accordance with the techniques of the disclosure.

FIG. 1B is an illustration depicting another example artificial reality system 20 in accordance with the techniques of the disclosure. Similar to artificial reality system 10 of FIG. 1A, in some examples, artificial reality system 20 of FIG. 1B may present and control user interface elements specifically designed for user interaction and manipulation within an artificial reality environment. Artificial reality system 20 may also, in various examples, generate and render certain graphical user interface elements to a user in response detection of to one or more particular gestures of the user.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128C (collectively, "virtual objects 128") as spatially overlaid upon real world objects 108A-108C (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may each operate substantially similar to HMD 112 of FIG. 1A by tracking hand 132 and/or arm 124 of user 110C, and rendering the portions of hand 132 that are within field of view 130 as virtual hand 136 within artificial reality content 122. HMD 112B may receive user inputs from controllers 114A held by user 110B. HMD 112A may also operate substantially similar to HMD 112 of FIG. 1A and receive user inputs by tracking movements of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using another type of communication links.

In a manner similar to the examples discussed above with respect to FIG. 1A, console 106 and/or HMD 112A of artificial reality system 20 generates and renders user interface elements which may be overlaid upon the artificial reality content displayed to user 110A. Moreover, console 106 and/or HMD 112A may trigger the generation and dynamic display of the user interface elements based on detection, via pose tracking, of intuitive, yet distinctive, gestures performed by user 110A. For example, artificial reality system 20 may dynamically present one or more graphical user interface elements in response to detecting one or more particular gestures by user 110A, such as particular motions, configurations, positions, and/or orientations of the user's hands, fingers, thumbs or arms. As shown in FIG. 1B, in addition to image data captured via a camera incorporated into HMD 112A, input data from external cameras 102 may be used to track and detect particular motions, configurations, positions, and/or orientations of hands and arms of users 110, such as hands 132A and 132B of user 110A, including movements of individual and/or combinations of digits (fingers, thumb) of the hand.

In this manner, the techniques described herein may provide for two-handed text input by detecting a pinching configuration of either hand 132A or 132B. For instance, when artificial reality system 20 outputs a virtual keyboard in the artificial reality content for HMD 112A and user 110A, HMD 112A or cameras 102 may detect a gesture that includes a motion of digits of either hand 132A or hand 132B to form a pinching configuration, as described herein. In some examples, rather than outputting a singular virtual keyboard, artificial reality system 20 may output a split virtual keyboard, with one half of the split keyboard output in the general proximity of the virtual representation of hand 132A and a second half of the split keyboard output in the general proximity of hand 132B. In this way, artificial reality system 20 may provide an ergonomic and natural split keyboard layout in the artificial reality content as opposed to a singular keyboard design.

Similarly, if artificial reality system 20 assigns one or more input characters to digits of the hands in the image data, artificial reality system 20 may analyze the image data captured by cameras 102 and HMD 112A to assign one or more input characters to digits on each of hands 132A and 132B. Artificial reality system may refrain from assigning input characters to one of the digits on each of hands 132A and 132B, such as the thumbs of each of hands 132A and 132B, instead assigning these digits as the selector digits for each of hands 132A and 132B. Artificial reality system 20 may then monitor the image data captured by cameras 102 or HMD 112A to detect one of hands 132A or 132B forming a gesture that includes a motion of digits of either of hands 132A or 132B forming pinching configuration. Artificial reality system 20 may then monitor the image data for a particular amount of time, detecting how many distinct times these two digits of either hand 132A or 132B form the pinching configuration within that amount of time. Artificial reality system 20 may then process a selection of one of the input characters for the particular digit of hand 132A or 132B based on the number of distinct times the two digits formed the pinching configuration.

Figure 2:
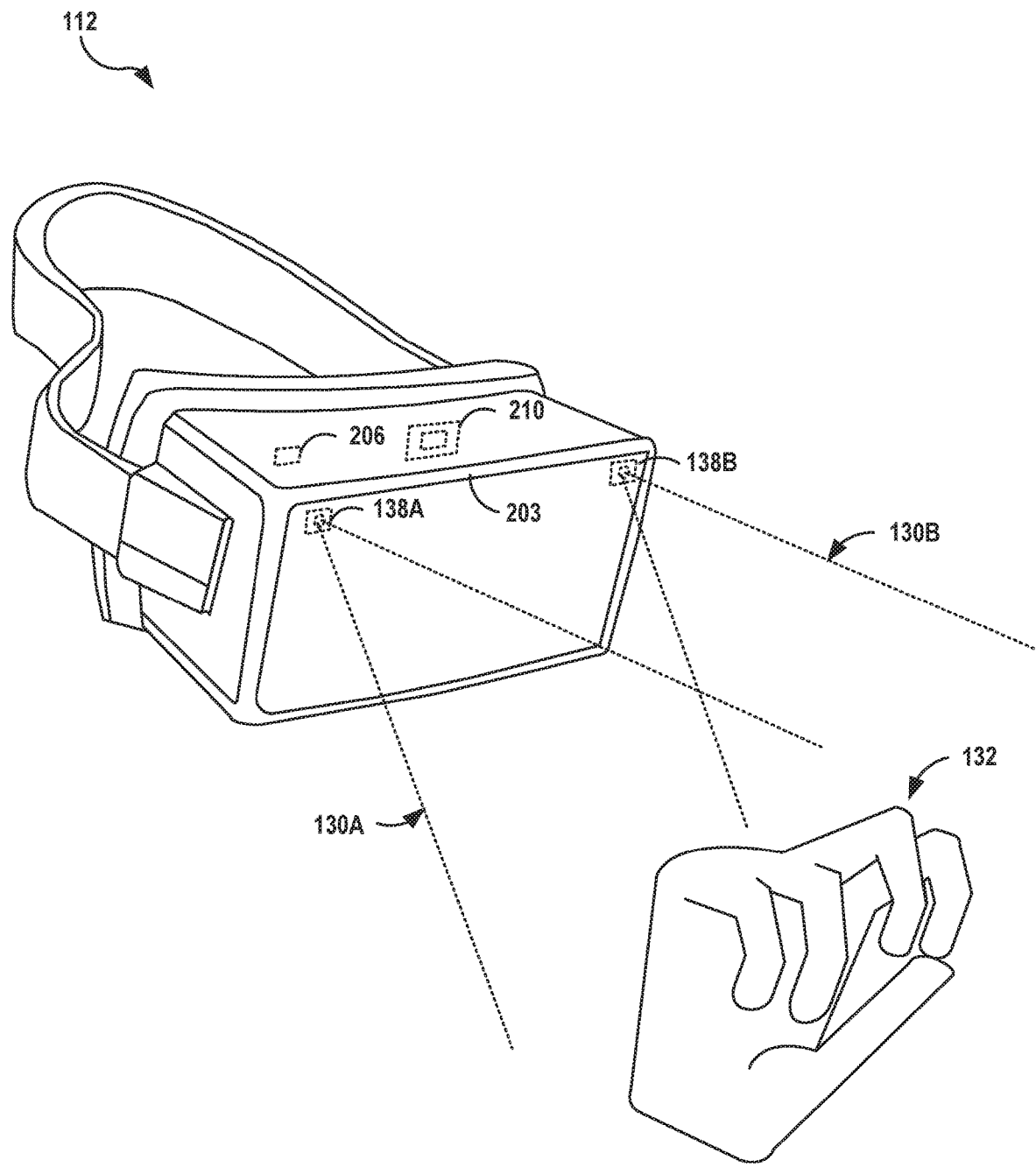
FIG. 2 is an illustration depicting an example HMD that operates in accordance with the techniques of the disclosure.

FIG. 2 is an illustration depicting an example HMD 112 configured to operate in accordance with the techniques of the disclosure. HMD 112 of FIG. 2 may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses.

As further shown in FIG. 2, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the sensed data, identify a specific gesture or combination of gestures performed by the user and, in response, perform an action. For example, in response to one identified gesture, control unit 210 may generate and render a specific user interface element overlaid on artificial reality content for display on electronic display 203. As explained herein, in accordance with the techniques of the disclosure, control unit 210 may perform object recognition within image data captured by image capture devices 138 to identify a hand 132, fingers, thumb, arm or another part of the user, and track movements of the identified part to identify pre-defined gestures performed by the user. In response to identifying a pre-defined gesture, control unit 210 takes some action, such as selecting an option from an option set associated with a user interface element, translating the gesture into input (e.g., characters), launching an application or otherwise displaying content, and the like. In some examples, control unit 210 dynamically generates and presents a user interface element, such as a menu, in response to detecting a pre-defined gesture specified as a "trigger" for revealing a user interface. In other examples, control unit 210 performs such functions in response to direction from an external device, such as console 106, which may perform, object recognition, motion tracking and gesture detection, or any part thereof.

In accordance with the techniques described herein, when the artificial reality content displayed on display 203 includes a virtual keyboard that is made up of one or more virtual keys, image capture devices 138 may capture image data that includes a motion of digits of user hand 132 forming a pinching configuration. From this image data, control unit 210 may detect a gesture that includes a motion of digits of hand 132 to form a pinching configuration. Once control unit 210 detects the gesture of the motion of the digits forming the pinching configuration is detected, a point of contact for the two digits involved in the pinching configuration is identified and control unit 210 identifies a corresponding location within the virtual environment made up by the artificial reality content. If the point of contact for the pinching configuration corresponds to a location of a virtual key in the virtual keyboard, then control unit 210 may recognize the motion of the digits forming the pinching configuration, or a motion of the digits releasing the pinching configuration, to be a selection of the virtual key at the location corresponding to the location of the point of contact. In response to this selection, control unit 210 may perform the action corresponding to the selection of the virtual key, such as inputting a text character or other ASCII character into a text input field or any other function that may be assigned to keys of a keyboard in a computing system.

In other examples of the techniques described herein, image capture devices 138, or other external cameras, may capture image data that includes user hand 132. Using this image data, control unit 210 may differentiate between the various digits of user hand 132. Control unit 210 may then assign one or more input characters to one or more of the digits in hand 132 captured in the image data. Control unit 210 may, in some examples, leave one digit of hand 132 in the image data, such as the thumb of hand 132, without input characters assigned to it, instead assigning this digit as a selector digit. Image capture devices 138 may then capture image data that includes a motion of the selector digit and a second digit of user hand 132 that control unit 210 assigned one or more input characters to forming a pinching configuration. Once control unit 210 detects this motion from the image data, control unit 210 may monitor the image data for a particular amount of time and to detect how many distinct instances of the two digits motioning to form and release the pinching configuration the particular amount of time. For instance, control unit 210 may detect that the two digits motion to form the pinching configuration, motion to release the pinching configuration, motion to form the pinching configuration again, motion to release the pinching configuration, and motion to form the pinching configuration yet again within the particular amount of time would make up three distinct instances of the pinching configuration. Based on this number of distinct instances, control unit 210 selects a corresponding one of the input characters assigned to the particular digit forming the pinching configuration with the selector digit. Control unit 210 uses this selection as the input for the combination of pinching configuration formations.

Figure 3:
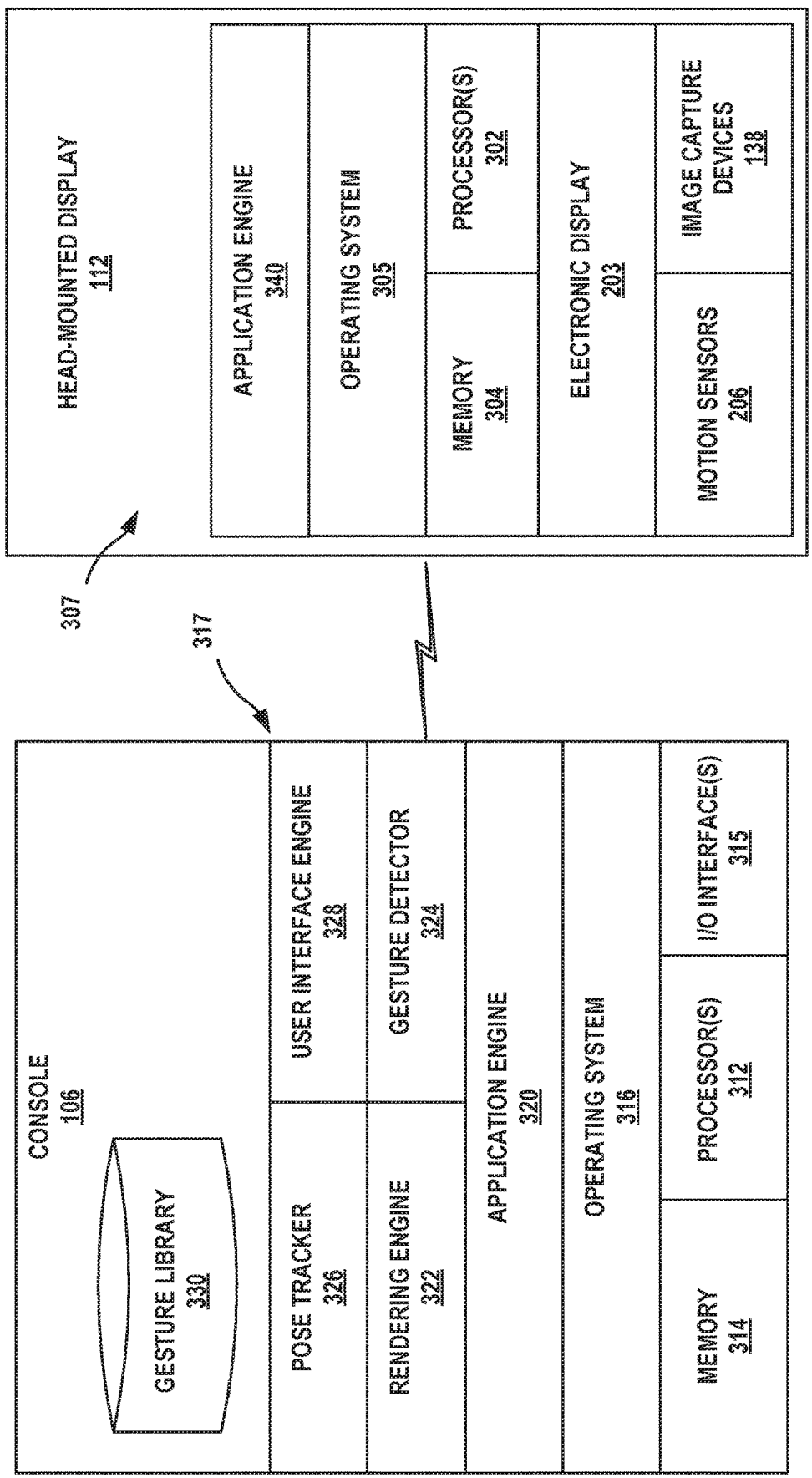
FIG. 3 is a block diagram showing example implementations of a console and an HMD of the artificial reality systems of FIGS. 1A, 1B.

FIG. 3 is a block diagram showing example implementations of console 106 and head mounted display 112 of artificial reality system 10, 20 of FIGS. 1A, 1B. In the example of FIG. 3, console 106 performs pose tracking, gesture detection, and user interface generation and rendering for HMD 112 in accordance with the techniques described herein based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the example of FIG. 2, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Moreover, based on the sensed data, gesture detector 324 analyzes the tracked motions, configurations, positions, and/or orientations of objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of the hand, digits, and/or arm based on the captured image data, and compare motion vectors of the objects to one or more entries in gesture library 330 to detect a gesture or combination of gestures performed by user 110. Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting objects, launching applications, and the like.

In accordance with the techniques described herein, image capture devices 138 may be configured to capture image data representative of a physical environment. HMD 112 may be configured to output artificial reality content. In one example, rendering engine 322 may be configured to render a virtual keyboard with a plurality of virtual keys as an overlay to the artificial reality content output by HMD 112. In some instances, the keyboard may be a virtual representation of a QWERTY keyboard, although other keyboards may also be rendered in accordance with the techniques described herein. In some instances, the virtual representation of the QWERTY keyboard may be a virtual representation of a contiguous QWERTY keyboard. In other instances, the virtual representation of the QWERTY keyboard may be virtual representations of two halves of a split QWERTY keyboard with a first half of the split QWERTY keyboard associated with a first hand and a second half of the split QWERTY keyboard associated with a second hand.

Gesture detector 324 may be configured to identify, from the image data captured by image capture devices 138, a gesture that matches an entry in gesture library 330. For instance, the particular gesture detected by gesture detector 324 may be a motion of a first digit of a hand and a second digit of the hand to form a pinching configuration. When gesture detector 324 detects such a gesture, gesture detector 324 may identify a point of contact between the first digit and the second digit while in the pinching configuration, and determining whether a location of the point of contact corresponds to a location of any virtual keys of the virtual keyboard. As an example, gesture detector 324 may determine that the point of contact is at a location that corresponds to a first virtual key of the plurality of virtual keys of the virtual keyboard. In this example, user interface engine 328 processes a selection of the first virtual key in response to the detected gesture.

In some instances, rather than simply detecting the gesture of the motion of the digits of the hand forming the pinching configuration, gesture detector 324 may further determine that, after the motion of the digits forming the pinching configuration, an addition motion of the digits releasing the pinching formation occurs before determining that the gesture is complete. In such instances, gesture detector 324 may determine the location of the point of contact as the location of the point of contact just prior to the pinching configuration being released, which would allow the user to move their hand around the virtual keyboard while in the pinching configuration prior to selecting the virtual key. In some further instances, in addition to requiring the pinch configuration formation and the release of the pinching configuration, gesture detector 324 may require detection of the pinching configuration being held for a threshold amount of time prior to being released in order to reduce accidental inputs in the keyboard.

In some instances, prior to identifying the gesture, gesture detector 324 may identify, from the image data captured by image capture devices 138 or external cameras, a location of the first digit of the hand with respect to the virtual keyboard, as well as a location of the second digit of the hand with respect to the virtual keyboard. Gesture detector 324 may then calculate a selection vector from the location of the first digit of the hand to the location of the second digit of the hand and determine an intersection point of the selection vector and the virtual keyboard. This intersection point would correspond to a predicted point of contact if the first digit and the second digit form the pinching configuration. Rendering engine 322 may render a graphical indication of the selection vector and/or the intersection point, such as by rendering a line representative of the selection vector itself, rendering a shape, e.g., a circle or dot, on the virtual keyboard representative of the intersection point, rendering a particular virtual key of the virtual keyboard with a different color scheme or filled with a different pattern than the remaining virtual keys of the virtual keyboard if the intersection point overlaps the particular virtual key, any combination of the above, or any other rendering that could provide a graphical indication of the selection vector and/or the intersection point. Upon identifying the gesture, gesture detector 324 may detect the point of contact for the pinching configuration as the intersection point of the selection vector and the first virtual key of the virtual keyboard.

Responsive to gesture detector 324 determining that the location of the point of contact corresponds to the first virtual key, user interface engine 328 may be configured to process a selection of the first virtual key in response to the identified gesture.

In some examples, gesture detector 324 may identify two-handed inputs in addition to one-handed inputs, enabling console 106 to detect compound inputs of multiple virtual keys of the virtual keyboard. In such instances, while the first digit and the second digit of a first hand are in the pinching configuration, gesture detector 324 may identify, from the image data captured by image capture devices 138, a second gesture. The second gesture may include a second motion of a first digit of a second hand and a second digit of the second hand to form a second pinching configuration. In the second pinching configuration, gesture detector 324 may identify a point of contact between the first digit of the second hand and the second digit of the second hand while in the pinching configuration as corresponding to a location of a second virtual key of the plurality of virtual keys of the virtual keyboard. Once this second gesture is detected, user interface engine 328 may receive a combined selection of the first virtual key and the second virtual key in response to the concurrent identification of the first gesture and the second gesture. For instance, if the first virtual key corresponds to a "SHIFT" key of a virtual keyboard, and the second virtual key corresponds to a "p" key of the virtual keyboard, user interface engine 328 may may receive a capital 'P' character as the output of the combined selection.

When user interface engine 328 receives the user input, whether it be the singular input of the first virtual key or the combined selection of the first and second virtual keys, rendering engine 322 may render an indication of the user input in response to the identified gesture(s). For instance, as part of a selected text field, rendering engine 322 may render, and HMD 112 may output for display on electronic display 203, the character corresponding to the first virtual key.

As another example of the techniques of this disclosure, gesture detector 324 may identify, from the image data, a gesture corresponding to an entry in gesture library 330. In this example, gesture detector 324 may identify the gesture as a motion of a first digit of a hand and a second digit of the hand to form a pinching configuration a particular number of times within a threshold amount of time.

User interface engine 328 may assign one or more input characters to one or more of a plurality of digits of the hand. For instance, user interface engine 328 may identify, from the image data captured by image capture devices 138 or external cameras, the multiple digits for the hand in the image data. User interface engine 328 may assign the one or more input characters to some subset of digits on the hand, such as all but one digit of the hand (e.g., the thumb of the hand), which is designated as the selector digit. The one or more input characters may be any of letters, numbers, symbols, other special characters (e.g., space characters or backspace characters), or a "NULL" character. In this assignment scheme, a number of times gesture detector 324 detects a distinct pinching configuration between the selector digit and a given digit of the hand may correspond to which input character of the plurality of input characters assigned to the given digit is selected by the user. In some instances, the input characters assigned to each digit may be a distinct set of input characters for each digit to which user interface engine 328 assigns input characters. In some instances, a "NULL" character may also be assigned to each digit that has been assigned input characters, enabling the user to cycle through the input characters assigned to the given digit to the "NULL" character if the original selection was an error. User interface engine 328 may process a selection of a first input character of the one or more input characters assigned to the second digit of the hand in response to the identified gesture.

In some examples, user interface engine 328 may map each of the one or more input characters in the distinct set of input characters assigned to the second digit of the hand to a selection number that is less than or equal to a cardinality of the distinct set.
User interface engine 328 may then determine the selection of the first input character based on the selection number mapped to the first input character being equal to the particular number of times the first digit of the hand and the second digit of the hand form the pinching configuration within the threshold amount of time for the identified gesture. In other words, if the characters 'a', and 'c' are each assigned to the second digit, the cardinality of the distinct set may equal 3. As such, the character 'a' may be mapped to the number 1, the character 'b' may be mapped to the number 2, and the character 'c' may be mapped to the number 3. If gesture detector 324 identifies 3 distinct pinching configurations in the identified gesture, user interface engine 328 may determine the desired input character is the 'c' character.

In other instances, user interface engine 328 may calculate a quotient with a remainder by dividing the particular number of times the first digit of the hand and the second digit of the hand form the pinching configuration within the threshold amount of time for the identified gesture by the cardinality of the distinct set. User interface engine 328 may then determine the selection of the first input character based on the selection number mapped to the first input character being equal to the remainder. In other words, if the characters 'a', and 'c' are each assigned to the second digit, the cardinality of the distinct set may equal 3. As such, the character 'a' may be mapped to the number 1, the character 'b' may be mapped to the number 2, and the character 'c' may be mapped to the number 0. If gesture detector 324 identifies 4 distinct pinching configurations in the identified gesture, user interface engine 328 may calculate the quotient of the distinct pinching configurations (i.e., 4) divided by the cardinality of the distinct set (i.e., 3) as 1 with a remainder of 1. Given the remainder of 1, and the character 'a' being mapped to the number 1, user interface engine 328 may determine the desired input character is the 'a' character.

In some instances, while gesture detector 324 is detecting the gesture within the threshold amount of time, rendering engine 322 may render a current input character of the one or more input characters assigned to the second digit of the hand that would be selected based on a current number of times the first digit of the hand and the second digit of the hand form the pinching configuration within the threshold period of time. For instance, in the example where the characters 'a', 'b', and 'c' are each assigned to the second digit, upon the first pinching configuration formed by the first digit and the second digit, rendering engine 322 may render, for output on a display of HMD 112, the character 'a'. If, within the threshold period of time, gesture detector 324 detects a release of the pinching configuration followed by an additional pinching configuration, rendering engine 322 may replace the rendering of the character 'a' with a rendering of the character 'b', and so on until the threshold amount of time passes.

When image capture devices 138 capture image data that includes two hands, user interface engine 328 may repeat the assignment process for the second hand. For instance, user interface engine 328 may assign a distinct set of input characters to each digit of one or more of a plurality of digits of the second hand in addition to the distinct sets of input characters assigned to the various digits of the first hand. In this way, the thumb of each hand may be designated as the selector digit, with the remaining digits of each hand providing the text input options for the system.

In some instances, to assist the user in recognizing which digit will produce which characters, rendering engine 322 may render the one or more characters assigned to the one or more of the plurality of digits of the hand as an overlay to the virtual representation of the hand in the artificial reality content. The ordering of such characters in the rendering may correspond to the number of distinct pinching configurations gesture detector 324 must detect for user interface engine 328 to select the particular character.

In examples where only letters, or a combination of letters and numbers, are assigned to the digits of the one or more hands, entries for additional gestures may be included in gesture library 330 for the entry of special characters, such as symbols, space characters, or backspace characters. In such examples, gesture detector 324 may identify, from the image data captured by image capture devices 138, a second gesture, such as a clap of two hands or the forming of a first with a single hand. User interface engine 328 may assign one or more special input characters to the second gesture, and process a selection of a first special input character of the one or more special input characters assigned to the second gesture in response to the identified second gesture.

In some instances, the threshold amount of time may be dynamic. For instance, gesture detector 324 may define the threshold amount of time as a particular amount of time after gesture detector 324 identifies the most recent pinching configuration. In other instances, gesture detector 324 may define the threshold amount of time as ending once gesture detector 324 identifies a new gesture other than a pinching configuration between the first digit and the second digit. For instance, if gesture detector 324 detects a first gesture of the first digit and the second digit forming the pinching configuration 2 distinct times, and then gesture detector 324 detects a second gesture of the first digit and a third digit of the hand forming a pinching configuration within the predefined threshold amount of time given for the first gesture, gesture detector 324 may dynamically cut off the input time for the first gesture and user interface engine 328 may select the input character mapped to the number 2 as the input character. Gesture detector 324 may then start monitoring the image data for the second gesture to determine the number of distinct times the first digit and the third digit form the pinching configuration. In this way, console 106 and HMD 112 may more quickly navigate through the text entry process.

Figure 4:
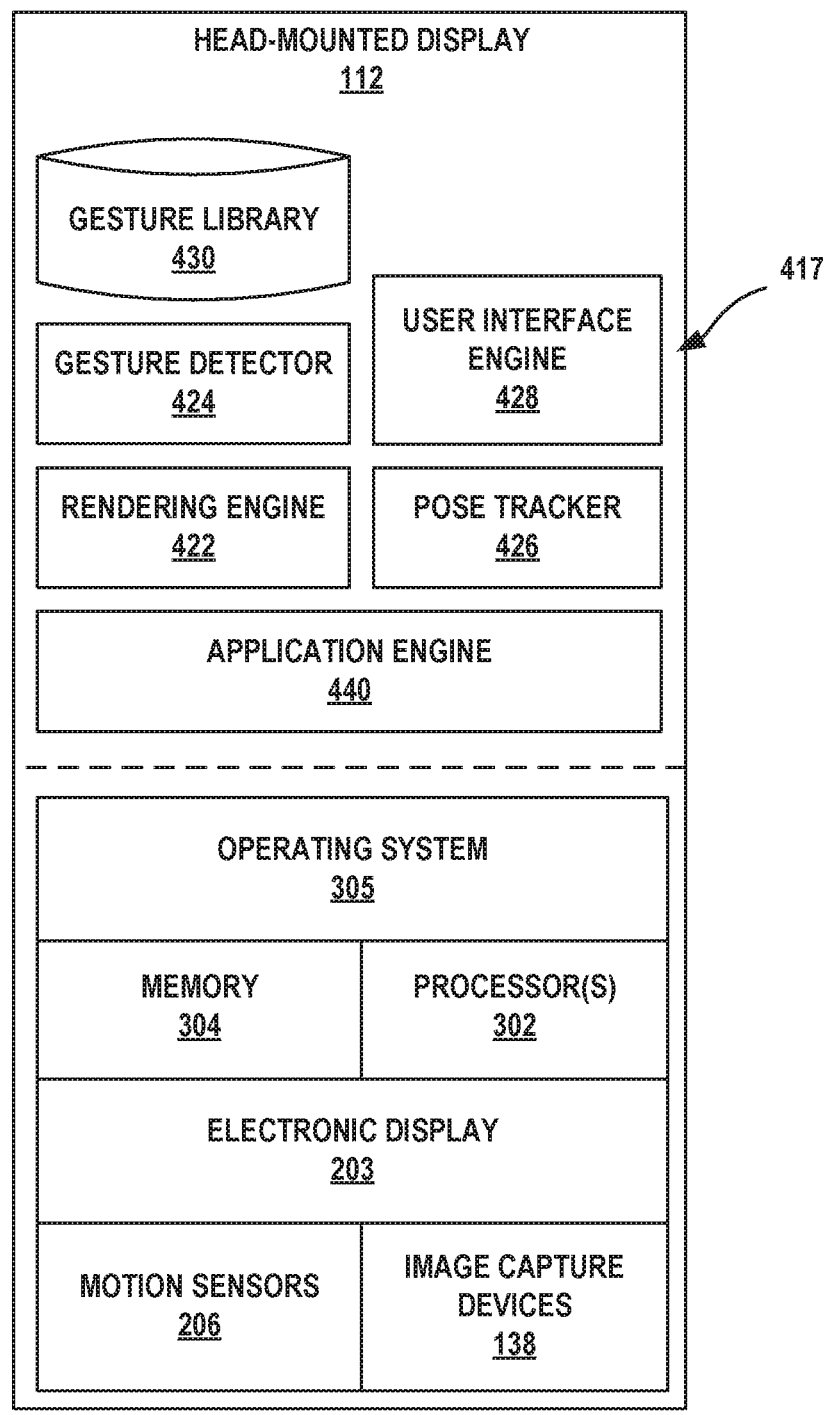
FIG. 4 is a block diagram depicting an example in which gesture detection and user interface generation is performed by the HMD of the artificial reality systems of FIGS. 1A, 1B in accordance with the techniques of the disclosure.

FIG. 4 is a block diagram depicting an example in which gesture detection and user interface generation is performed by HMD 112 of the artificial reality systems of FIGS. 1A, 1B in accordance with the techniques of the disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct user interface elements overlaid on, or as part of, the artificial content for display to user 110 in accordance with detected gestures of user 110. In some examples, rendering engine 422 constructs the 3D, artificial reality content which may be overlaid, at least in part, upon the real-world, physical environment of user 110.

Similar to the examples described with respect to FIG. 3, based on the sensed data, gesture detector 424 analyzes the tracked motions, configurations, positions, and/or orientations of objects (e.g., hands, arms, wrists, fingers, palms, thumbs) of the user to identify one or more gestures performed by user 110. In accordance with the techniques of the disclosure, user interface engine 428 generates user interface elements as part of, e.g., overlaid upon, the artificial reality content to be displayed to user 110 and/or performs actions based on one or more gestures or combinations of gestures of user 110 detected by gesture detector 424. More specifically, gesture detector 424 analyzes objects recognized within image data captured by image capture devices 138 of HMD 112 and/or sensors 90 or external cameras 102 to identify a hand and/or arm of user 110, and track movements of the hand and/or arm relative to HMD 112 to identify gestures performed by user 110. Gesture detector 424 may track movement, including changes to position and orientation, of the hand, digits, and/or arm based on the captured image data, and compare motion vectors of the objects to one or more entries in gesture library 430 to detect a gesture or combination of gestures performed by user 110.

Gesture library 430 is similar to gesture library 330 of FIG. 3. Each of the entries in gesture library 430 may specify, for the defined gesture or series of gestures, conditions that are required for the gesture to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

In response to detecting a matching gesture or combination of gestures, HMD 112 performs the response or action assigned to the matching entry in gesture library 430. For example, in accordance with the techniques of this disclosure, certain specialized gestures may be pre-defined such that, in response to gesture detector 424 detecting one of the pre-defined gestures, user interface engine 428 dynamically generates a user interface as an overlay to artificial reality content being displayed to the user, thereby allowing the user 110 to easily invoke a user interface for configuring HMD 112 while viewing artificial reality content. In other examples, in response to gesture detector 424 detecting one of the pre-defined gestures, user interface engine 428 and/or application engine 440 may receive input, select values or parameters associated with user interface elements, launch applications, modify configurable settings, send messages, start or stop processes or perform other actions.

In accordance with the techniques described herein, image capture devices 138 may be configured to capture image data representative of a physical environment. HMD 112 may be configured to output artificial reality content. Rendering engine 422 may be configured to render a virtual keyboard with a plurality of virtual keys as an overlay to the artificial reality content output by HMD 112. In some instances, the keyboard may be a virtual representation of a QWERTY keyboard, although other keyboards may also be rendered in accordance with the techniques described herein. In some instances, the virtual representation of the QWERTY keyboard may be a virtual representation of a contiguous QWERTY keyboard. In other instances, the virtual representation of the QWERTY keyboard may be virtual representations of two halves of a split QWERTY keyboard with a first half of the split QWERTY keyboard associated with a first hand and a second half of the split QWERTY keyboard associated with a second hand.

Gesture detector 424 may be configured to identify, from the image data captured by image capture devices 138, a gesture that matches an entry in gesture library 430. For instance, the particular gesture detected by gesture detector 424 may be a motion of a first digit of a hand and a second digit of the hand to form a pinching configuration. When gesture detector 424 detects such a pinching configuration, gesture detector 424 may locate a point of contact between the first digit and the second digit while in the pinching configuration, determining whether the location of the point of contact corresponds to a location of any virtual keys of the virtual keyboard. In the example of FIG. 4, gesture detector 424 may determine that the point of contact is at a location that corresponds to a first virtual key of the plurality of virtual keys of the virtual keyboard.

In some instances, rather than simply detecting the gesture of the motion of the digits of the hand forming the pinching configuration, gesture detector 424 may further determine that, after the motion of the digits forming the pinching configuration, an additional motion of the digits releasing the pinching formation occurs before determining that the gesture is complete. In such instances, gesture detector 424 may determine the location of the point of contact as the location of the point of contact just prior to the pinching configuration being released, which would allow the user to move their hand around the virtual keyboard while in the pinching configuration prior to selecting the virtual key. In some further instances, in addition to requiring the pinch configuration formation and the release of the pinching configuration, gesture detector 424 may require detection of the pinching configuration being held for a threshold amount of time prior to being released in order to reduce accidental inputs in the keyboard.

In some instances, prior to identifying the gesture, gesture detector 424 may identify, from the image data captured by image capture devices 138 or external cameras, a location of the first digit of the hand with respect to the virtual keyboard, as well as a location of the second digit of the hand with respect to the virtual keyboard. Gesture detector 424 may then calculate a selection vector from the location of the first digit of the hand to the location of the second digit of the hand and determine an intersection point of the selection vector and the virtual keyboard. This intersection point would correspond to a predicted point of contact if the first digit and the second digit form the pinching configuration. Rendering engine 422 may render a graphical indication of the selection vector and/or the intersection point, such as by rendering a line representative of the selection vector itself, rendering a shape on the virtual keyboard representative of the intersection point, rendering a particular virtual key of the virtual keyboard with a different color scheme or filled with a different pattern than the remaining virtual keys of the virtual keyboard if the intersection point overlaps the particular virtual key, any combination of the above, or any other rendering that could provide a graphical indication of the selection vector and/or the intersection point. Upon identifying the gesture, gesture detector 424 may detect the point of contact for the pinching configuration as the intersection point of the selection vector and the first virtual key of the virtual keyboard.

Responsive to gesture detector 424 determining that the location of the point of contact corresponds to the first virtual key, user interface engine 428 may be configured to process a selection of the first virtual key in response to the identified gesture.

In some examples, gesture detector 424 may identify two-handed inputs in addition to one-handed inputs, enabling HMD 112 to detect compound inputs of multiple virtual keys of the virtual keyboard. In such instances, while the first digit and the second digit are in the pinching configuration, gesture detector 424 may identify, from the image data captured by image capture devices 138 or external cameras, a second gesture. The second gesture may include a second motion of a first digit of a second hand and a second digit of the second hand to form a second pinching configuration. In the second pinching configuration, gesture detector 424 may identify a point of contact between the first digit of the second hand and the second digit of the second hand while in the pinching configuration as corresponding to a location of a second virtual key of the plurality of virtual keys of the virtual keyboard. Once this second gesture is detected, user interface engine 428 may receive a combined selection of the first virtual key and the second virtual key in response to the concurrent identification of the first gesture and the second gesture. For instance, if the first virtual key corresponds to a "SHIFT" key of a virtual keyboard, and the second virtual key corresponds to a "9" key of the virtual keyboard, user interface engine 428 may receive a '(' character as the output of the combined selection.

When user interface engine 428 receives the ultimate input, whether it be the singular input of the first virtual key of the combined selection of the first and second virtual keys, rendering engine 422 may render an indication of the selection of the first virtual key in response to the identified gesture. For instance, as part of a selected text field, rendering engine 422 may render, and user interface engine 428 may output for display on electronic display 203, the character corresponding to the first virtual key within the selected text field.

In accordance with other techniques described herein, image capture devices 138 may capture image data representative of a physical environment. HMD 112 may output artificial reality content.

Gesture detector 424 may then identify, from the image data, a gesture as corresponding to an entry in gesture library 430. In this example, gesture detector 424 may identify the gesture as a motion of a first digit of a hand and a second digit of the hand to form a pinching configuration a particular number of times within a threshold amount of time.

User interface engine 428 may assign one or more input characters to one or more of a plurality of digits of the hand. For instance, user interface engine 428 may identify, from the image data captured by image capture devices 138, the multiple digits for the hand in the image data. User interface engine 428 may assign the one or more input characters to some subset of digits on the hand, such as all but one digit of the hand (e.g., the thumb of the hand), which is designated as the selector digit. The one or more input characters may be any of letters, numbers, symbols, other special characters (e.g., space characters or backspace characters), or a "NULL" character. In some instances, the input characters assigned to each digit may be a distinct set of input characters for each digit that user interface engine 428 assigns input characters to. In some instance, a "NULL" character may also be assigned to each digit assigned input characters, enabling the user to cycle through the input characters to the "NULL" character if the selection was an error. With this mapping, user interface engine 328 may process a selection of a first input character of the one or more input characters assigned to the second digit of the hand in response to the identified gesture.

In this mapping, the number of times gesture detector 424 detects a distinct pinching configuration may correspond to which input character of the plurality of input characters is selected by the gesture. For instance, user interface engine 428 may map each of the one or more input characters in the distinct set of input characters assigned to the second digit of the hand to a selection number that is less than or equal to a cardinality of the distinct set.

In some instances, user interface engine 428 may then determine the selection of the first input character based on the selection number mapped to the first input character being equal to the particular number of times the first digit of the hand and the second digit of the hand form the pinching configuration within the threshold amount of time for the identified gesture. In other words, if the characters 'a', and 'c' are each assigned to the second digit, the cardinality of the distinct set may equal 3. As such, the character 'a' may be mapped to the number 1, the character 'b' may be mapped to the number 2, and the character 'c' may be mapped to the number 3. If gesture detector 424 identifies 3 distinct pinching configurations in the identified gesture, user interface engine 428 may determine the desired input character is the 'c' character.

In other instances, user interface engine 428 may calculate a quotient with a remainder by dividing the particular number of times the first digit of the hand and the second digit of the hand form the pinching configuration within the threshold amount of time for the identified gesture by the cardinality of the distinct set. User interface engine 428 may then determine the selection of the first input character based on the selection number mapped to the first input character being equal to the remainder. In other words, if the characters 'a', 'b', and 'c' are each assigned to the second digit, the cardinality of the distinct set may equal 3. As such, the character 'a' may be mapped to the number 1, the character 'b' may be mapped to the number 2, and the character 'c' may be mapped to the number 0. If gesture detector 424 identifies 4 distinct pinching configurations in the identified gesture, user interface engine 428 may calculate the quotient of the distinct pinching configurations (i.e., 4) divided by the cardinality of the distinct set (i.e., 3) as 1 with a remainder of 1. Given the remainder of 1, and the character 'a' being mapped to the number 1, user interface engine 428 may determine the desired input character is the 'a' character.

In some instances, while gesture detector 424 is detecting the gesture within the threshold amount of time, rendering engine 422 may render a current input character of the one or more input characters assigned to the second digit of the hand that would be selected based on a current number of times the first digit of the hand has and the second digit of the hand form the pinching configuration within the threshold period of time. For instance, in the example where the characters 'a', 'b', and 'c' are each assigned to the second digit, upon the first pinching configuration formed by the first digit and the second digit, rendering engine 422 may render, for output on electronic display 203 of HMD 112, the character 'a'. If, within the threshold period of time, gesture detector 424 detects a release of the pinching configuration followed by an additional pinching configuration, rendering engine 422 may replace the rendering of the character 'a' with a rendering of the character 'b', and so on until the threshold amount of time passes.

When image capture devices 138 capture image data that includes two hands, user interface engine 428 may repeat the assignment process for the second hand. For instance, user interface engine 428 may assign a distinct set of input characters to each digit of one or more of a plurality of digits of the second hand in addition to the distinct sets of input characters assigned to the various digits of the first hand. In this way, the thumb of each hand may be designated as the selector digit, with the remaining digits of each hand providing the text input options for the system.

In some instances, to assist the user in recognizing which digit will produce which characters, rendering engine 422 may render the one or more characters assigned to the one or more of the plurality of digits of the hand as an overlay to the virtual representation of the hand in the artificial reality content. The ordering of such characters in the rendering may correspond to the number of distinct pinching configurations gesture detector 424 must detect for user interface engine 428 to select the particular character.

In examples where only letters, or a combination of letters and numbers, are assigned to the digits of the one or more hands, entries for additional gestures may be included in gesture library 430 for the entry of special characters, such as symbols, space characters, or backspace characters. In such examples, gesture detector 424 may identify, from the image data captured by image capture devices 138, a second gesture. User interface engine 428 may assign one or more special input characters to the second gesture, and process a selection of a first special input character of the one or more special input characters assigned to the second gesture in response to the identified second gesture.

In some instances, the threshold amount of time may be dynamic. For instance, gesture detector 424 may define the threshold amount of time as a particular amount of time after gesture detector 424 identifies the most recent pinching configuration. In other instances, gesture detector 424 may define the threshold amount of time as ending once gesture detector 424 identifies a new gesture other than a pinching configuration between the first digit and the second digit. For instance, if gesture detector 424 detects a first gesture of the first digit and the second digit forming the pinching configuration 5 distinct times, and then gesture detector 424 detects a second gesture of the first digit and a third digit of the hand forming a pinching configuration within the predefined threshold amount of time given for the first gesture, gesture detector 424 may dynamically cut off the input time for the first gesture and user interface engine 428 may select the input character mapped to the number 5 as the input character. Gesture detector 424 may then start monitoring the image data for the second gesture to determine the number of distinct times the first digit and the third digit form the pinching configuration. In this way, HMD 112 may more quickly navigate through the text entry process.

Figure 5A:
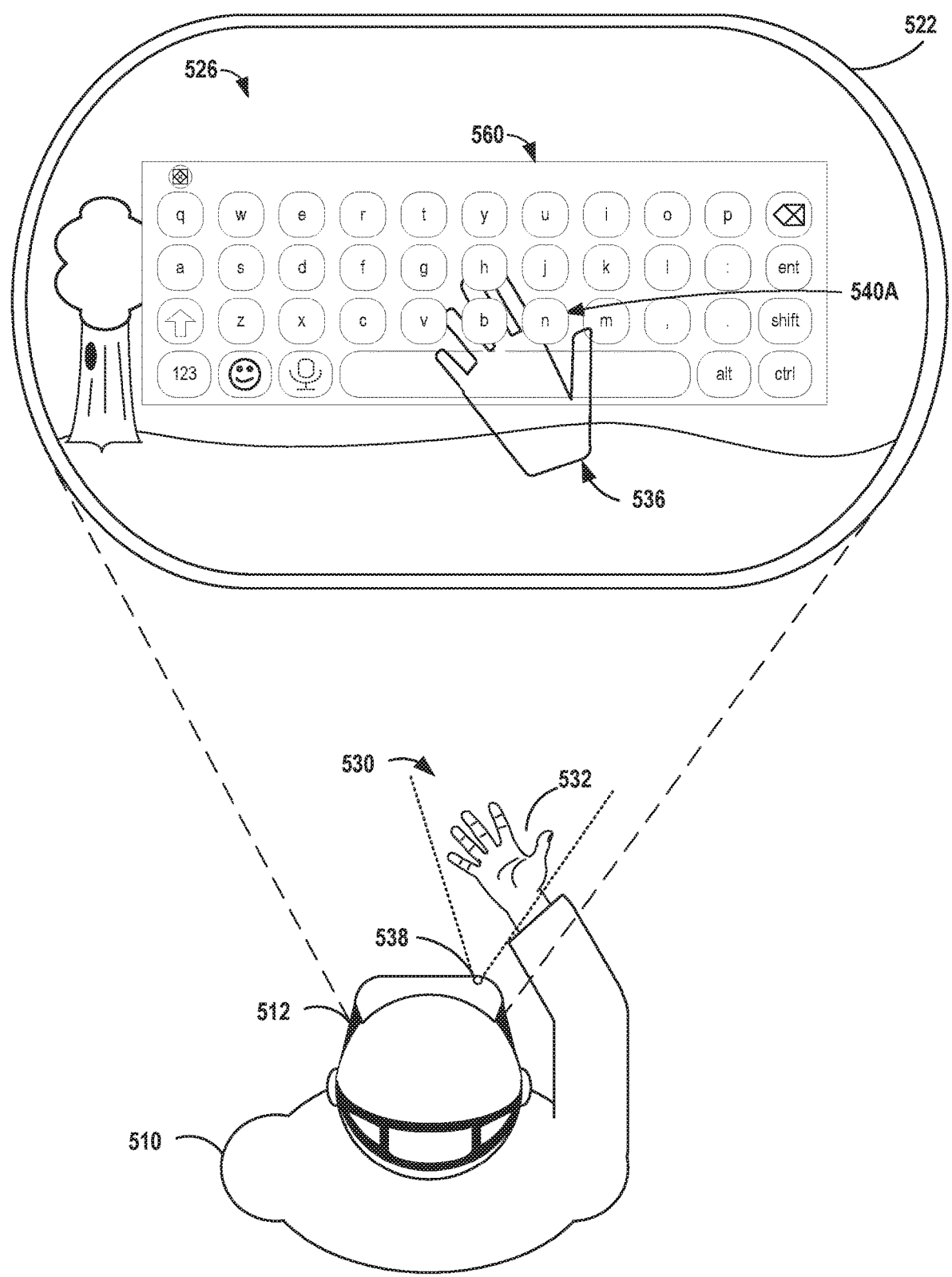
FIGS. 5A and 5B are illustrations depicting an example artificial reality system configured to output a virtual keyboard and to detect a formation of a pinching configuration at a location corresponding to a virtual key of the virtual keyboard, in accordance with the techniques of the disclosure.
Figure 5B:
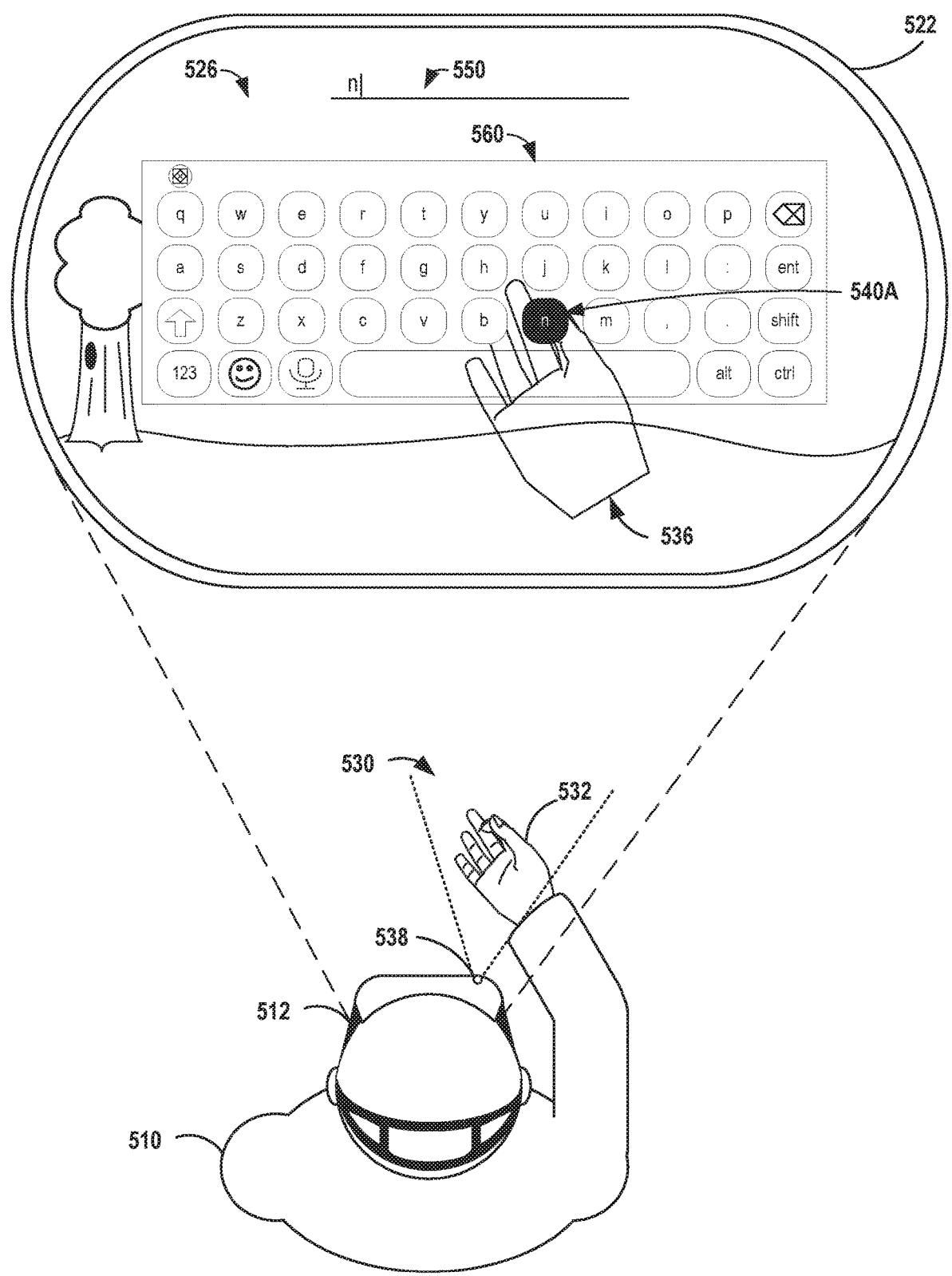

FIGS. 5A and 5B are illustrations depicting an example artificial reality system configured to output a virtual keyboard and to detect a formation of a pinching configuration at a location corresponding to a virtual key of the virtual keyboard, in accordance with the techniques of the disclosure. HMD 512 of FIG. 5 may be an example of any of HMDs 112 of FIGS. 1A and 1B. HMD 512 may be part of an artificial reality system, such as artificial reality systems 10, 20 of FIGS. 1A, 1B, or may operate as a stand-alone, mobile artificial realty system configured to implement the techniques described herein. While the below description describes HMD 512 performing various actions, a console connected to HMD 512, or particular engines within the console or HMD 512, may perform the various functions described herein. For instance, a rendering engine inside HMD 512 or a console connected to HMD 512 may perform the rendering operations, and a gesture detector inside HMD 512 or a console connected to HMD 512 may analyze image data to detect a motion of digits of hand 632A or 632B to form a pinching configuration in accordance with one or more of the techniques described herein.

In FIG. 5A, image capture devices 538 of HMD 512 capture image data representative of objects in the real world, physical environment that are within a field of view 530 of image capture devices 538. Field of view 530 typically corresponds with the viewing perspective of HMD 512. In some examples, such as the illustrated example of FIG. 5A, the artificial reality application renders the portions of hand 532 of user 510 that are within field of view 530 as a virtual hand 536 overlaid on top of virtual background 526 within artificial reality content 522. In other examples, the artificial reality application may present a real-world image of hand 532 of user 510 within artificial reality content 522 comprising mixed reality and/or augmented reality. In either example, user 510 is able to view the portions of their hand 532 within field of view 530 as objects within artificial reality content 522. In the example of FIG. 5A, artificial reality content 522 also includes virtual keyboard 560 having a plurality of virtual keys including virtual key 540A, which is assigned the 'n' character. In this example, virtual keyboard 560 is a virtual representation of a contiguous QWERTY keyboard.

HMD 512 may render virtual keyboard 560 such that it appears to be sitting atop virtual hand 536, which is faced palm up to mirror the configuration of hand 532. HMD 512 may render a thumb of virtual hand 536 such that it appears to extend above virtual keyboard 560, while HMD 512 may render the remaining digits of virtual hand 536 such that the remaining digits appear to fall below virtual keyboard 560. As such, when HMD 512 detects a motion of the thumb and another digit of hand 532 forming a pinching configuration, HMD 512 renders the motion such that the thumb and the additional digit motion to form the pinching configuration with virtual keyboard 560 in between the pinching configuration.

In FIG. 5B, image capture devices 538 of HMD 512 capture image data of hand 532 of user 510 performing a gesture that comprises a motion of a first digit and a second digit of hand 532 (e.g., a thumb and an index finger) to form a pinching configuration. Based on the captured image data of hand 532 at a given location in the physical environment, HMD 512 may render virtual hand 536 as an overlay to artificial reality content 522 at a corresponding location in the artificial reality environment. Upon detecting the gesture from the image data, HMD 512 may determine that a location of the point of contact between the two digits while in the pinching configuration corresponds to a location of virtual key 540A. As such, HMD 512 may process a selection of virtual key 540A, or the 'n' character, as user input. HMD 512 may then render and output, in artificial reality content 522, text field 550 to include the selected 'n' character. HMD 512 may also render virtual key 540A such that the fill or pattern of virtual key 540A is different from the rest of the virtual keys in virtual keyboard 560, such as by inverting the color scheme of virtual key 540A, in order to provide an additional visual indication of the selected virtual key.

Figure 6A:
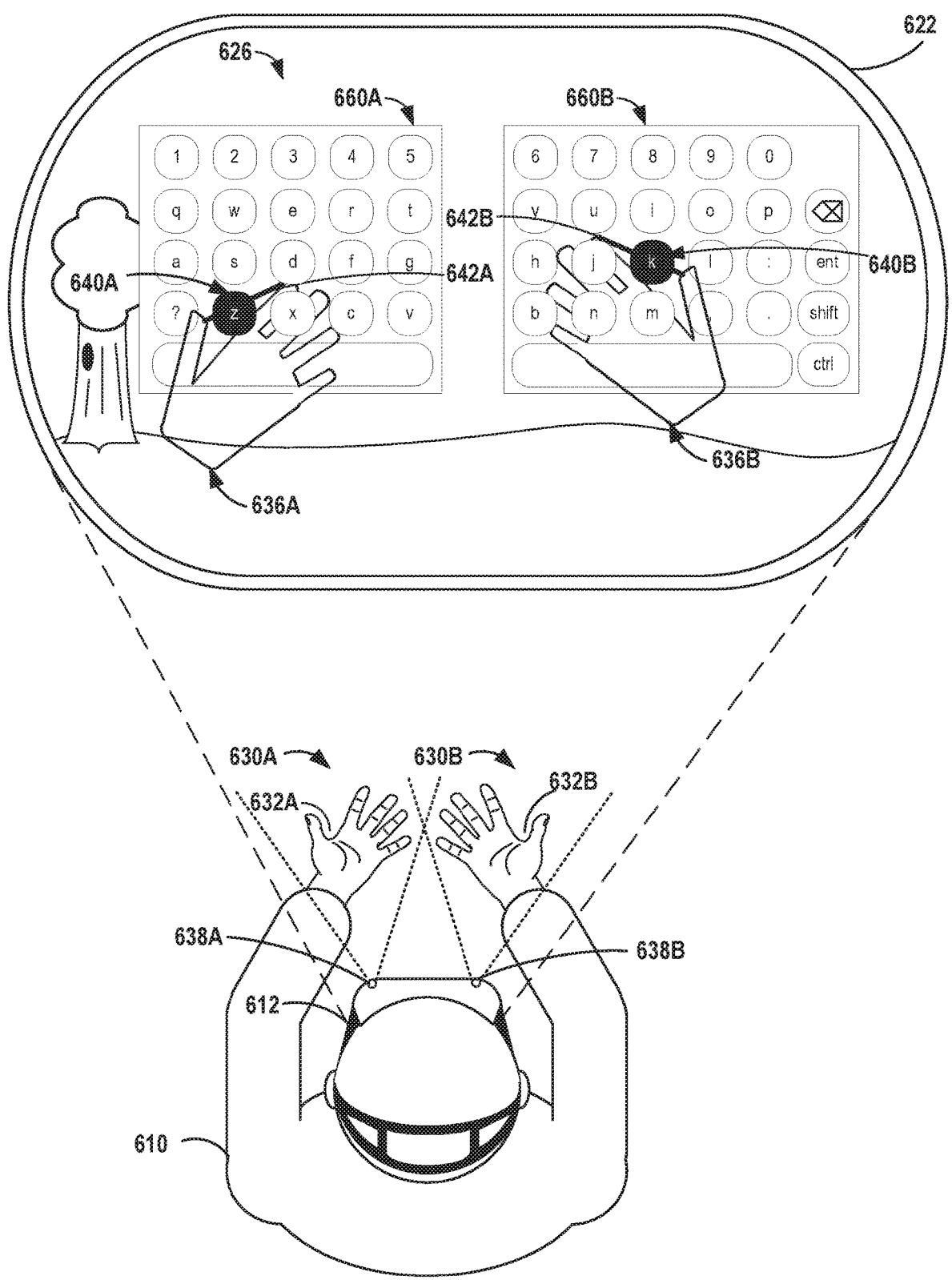
FIGS. 6A and 6B are illustrations depicting an example artificial reality system configured to output a split virtual keyboard and to detect a formation of a pinching configuration at a location corresponding to a virtual key of the split virtual keyboard, in accordance with the techniques of the disclosure.
Figure 6B:
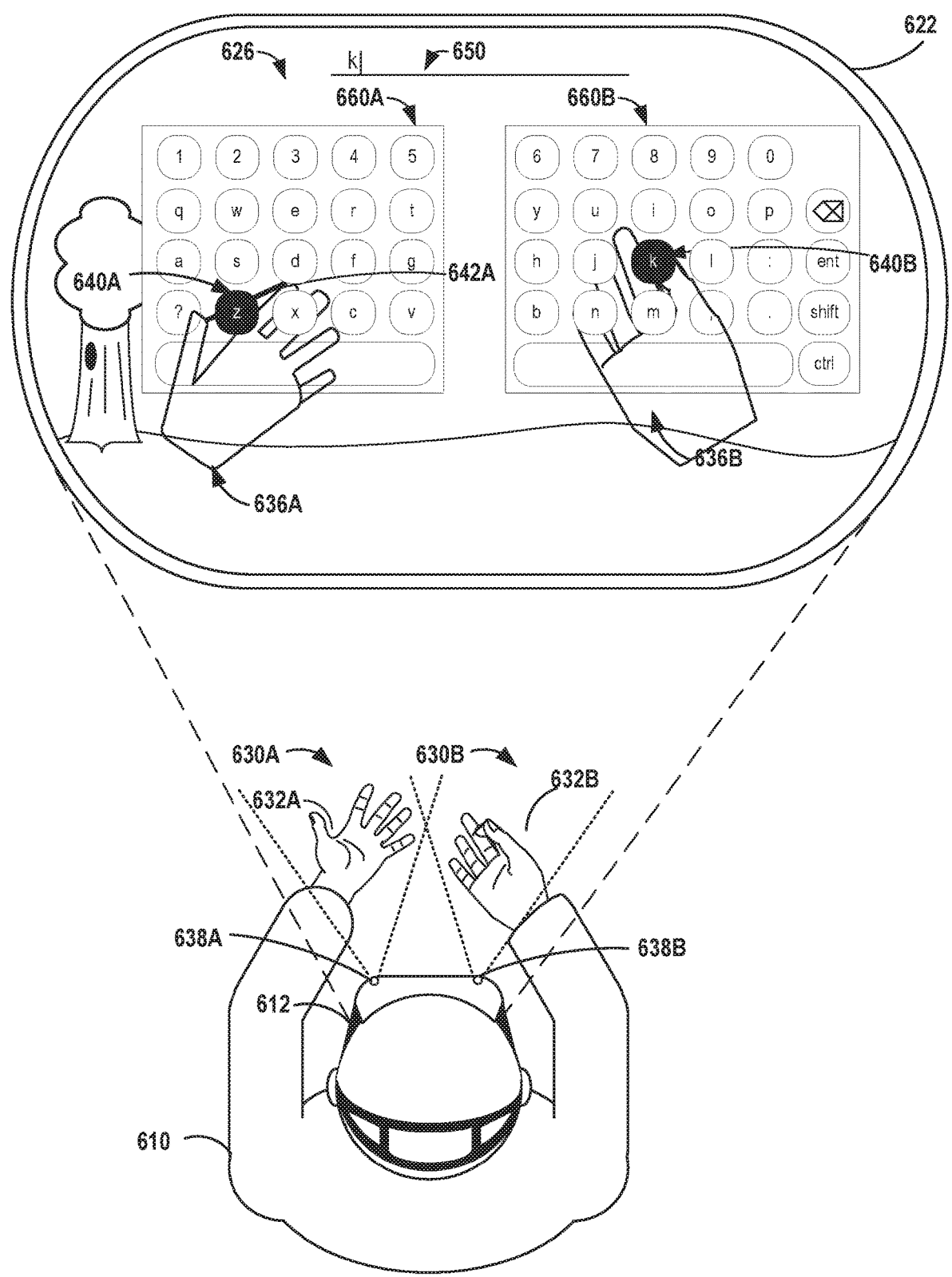

FIGS. 6A and 6B are illustrations depicting an example artificial reality system configured to output a split virtual keyboard and to detect a formation of a pinching configuration at a location corresponding to a virtual key of the split virtual keyboard, in accordance with the techniques of the disclosure. HMD 612 of FIG. 6 may be an example of any of HMDs 112 of FIGS. 1A and 1B. HMD 612 may be part of an artificial reality system, such as artificial reality systems 10, 20 of FIGS. 1A, 1B, or may operate as a stand-alone, mobile artificial realty system configured to implement the techniques described herein. While the below description describes HMD 612 performing various actions, a console connected to HMD 612, or particular engines within the console or HMD 612, may perform the various functions described herein. For instance, a rendering engine inside HMD 612 or a console connected to HMD 612 may perform the rendering operations, and a gesture detector inside HMD 612 or a console connected to HMD 612 may analyze image data to detect a motion of digits of hand 632A or 632B to form a pinching configuration in accordance with one or more of the techniques described herein.

In FIG. 6A, image capture devices 638A and 638B of HMD 612 capture image data representative of objects in the real world, physical environment that are within fields of view 630A and 630B of image capture devices 638A and 638B. Fields of view 630A and 630B typically corresponds with the viewing perspective of HMD 612. In some examples, such as the illustrated example of FIG. 6A, the artificial reality application renders the portions of hands 632A and 632B of user 610 that are within fields of view 630A and 630B as virtual hands 636A and 636B within artificial reality content 622. In other examples, the artificial reality application may present a real-world image of hands 632A and 632B of user 610 within artificial reality content 622 comprising mixed reality and/or augmented reality. In either example, user 610 is able to view the portions of their hands 632A and 632B within fields of view 630A and 630B as objects within artificial reality content 622. In the example of FIG. 6A, artificial reality content 622 also includes virtual keyboards 660A and 660B for each of hands 632A and 632B, respectively, overlaid on top of background 626 in artificial reality content 622. In this example, virtual keyboards 660A and 660B are virtual representations of two halves of a split QWERTY keyboard that includes multiple virtual keys, including virtual key 640A assigned the 'z' character and virtual key 640B assigned the 'k' character.

HMD 612 may render the virtual keyboards such that virtual keyboard 660A appears to be sitting atop virtual hand 636A and such that virtual keyboard 660B appears to be sitting atop virtual hand 636B, each of which is faced palm up to mirror the configuration of hands 632A and 632B, respectively. HMD 612 may render the thumbs of virtual hands 636A and 636B such that they appear to extend above virtual keyboards 660A and 660B, respectively, while HMD 612 may render the remaining digits of virtual hands 636A and 636B such that the remaining digits appear to fall below virtual keyboards 660A and 660B, respectively. As such, when HMD 612 detects a motion of the thumb and another digit of one of hands 632A or 632B forming a pinching configuration, HMD 612 renders the motion such that the thumb and the additional digit motion to form the pinching configuration with the respective one of virtual keyboards 660A or 660B in between the pinching configuration.

As illustrated in FIG. 6A, artificial reality content 622 also includes selection vectors 642A and 642B. HMD 612 may calculate these selection vectors by identifying a location of a first digit of each of hands 630A and 630B, identifying a location of a second digit of each of hands 630A and 630B, and calculating selection vectors 642A and 642B as vectors connecting the locations of the respective digits of the respective hands 632A and 632B. Intersection points of selection vectors 642A and 642B and virtual keyboards 660A and 660B, respectively, correspond to predicted points of contact of the digits of hands 630A and 630B. For example, HMD 612 may determine that an intersection point of selection vector 642A and virtual keyboard 660A corresponds to virtual key 640A, and that an intersection point of selection vector 642B and virtual keyboard 660B corresponds to virtual key 640B. HMD 612 may render virtual keys 640A and 640B such that the fill or pattern of virtual keys 640A and 640B are different from the rest of the virtual keys in virtual keyboards 660A and 660B, such as by inverting the color scheme of virtual keys 640A and 640B, in order to provide an additional visual indication of which virtual keys would be selected if the digits of the corresponding hand 632A or 632B were to form the pinching configuration.

In FIG. 6B, image capture devices 638A and/or 638B capture image data of hand 632B of user 610 performing a gesture that comprise a motion of a first digit and a second digit of hand 632B (e.g., a thumb and an index finger) to form a pinching configuration. Based on the captured image data of hand 632B at a given location in the physical environment, HMD 612 may render virtual hand 636B as an overlay to artificial reality content 622 at a corresponding location in the artificial reality environment. Upon detecting the gesture from the image data, HMD 612 may determine that a location of the point of contact between the two digits of hand 632B while in the pinching configuration corresponds to a location of virtual key 640B. As such, HMD 612 may process a selection of virtual key 640B, or the 'k' character, as user input. HMD 612 may then render and output, in artificial reality content 622, text field 650 to include the selected 'k' character.

Figure 7A:
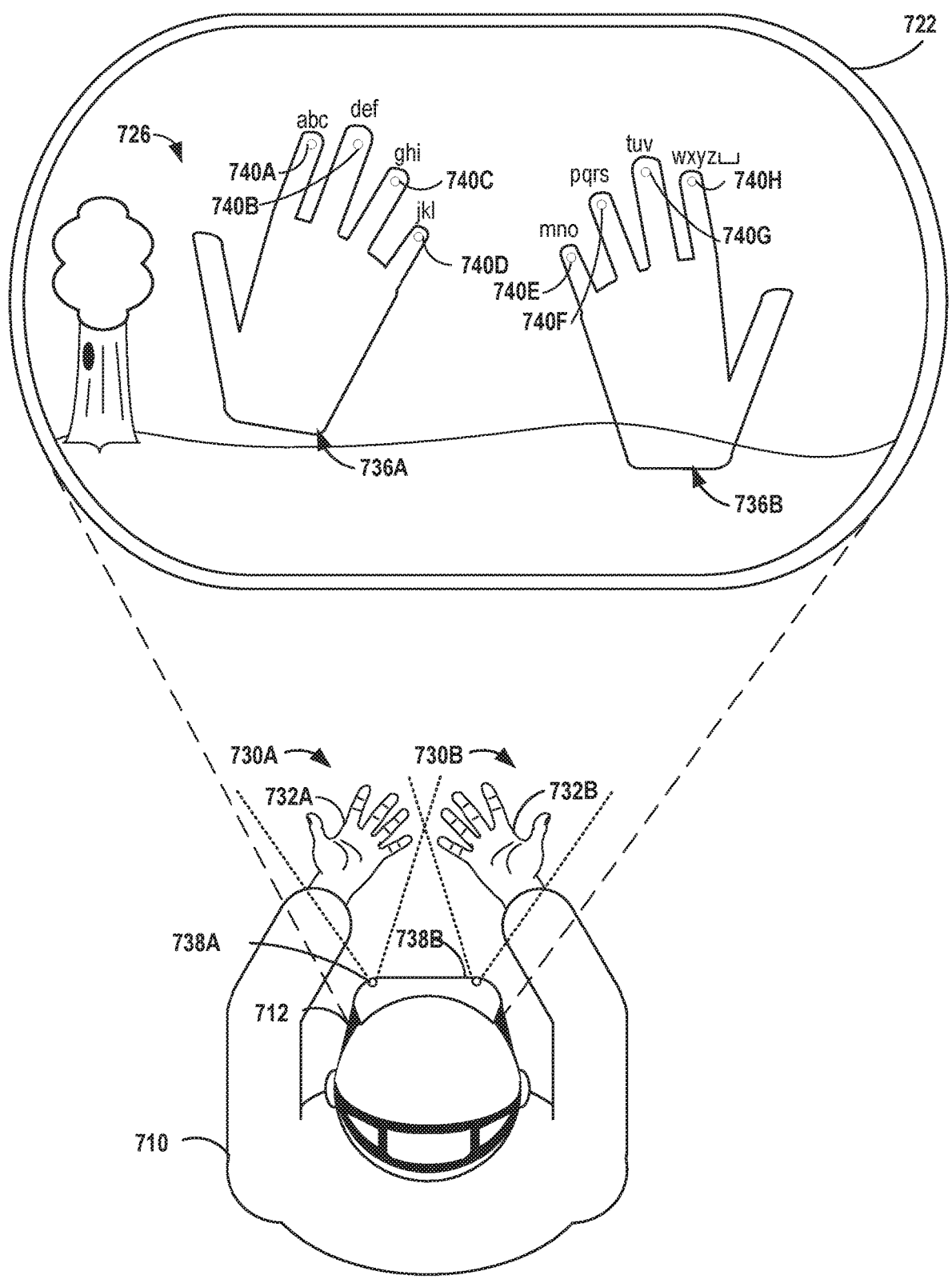
FIGS. 7A and 7B are illustrations depicting an example artificial reality system configured to detect a formation of a pinching configuration a particular number of times and to receive, as user input, an input character based on the particular digit involved in the pinching configuration and the particular number of times formation of the pinching configuration is detected, in accordance with the techniques of the disclosure.
Figure 7B:
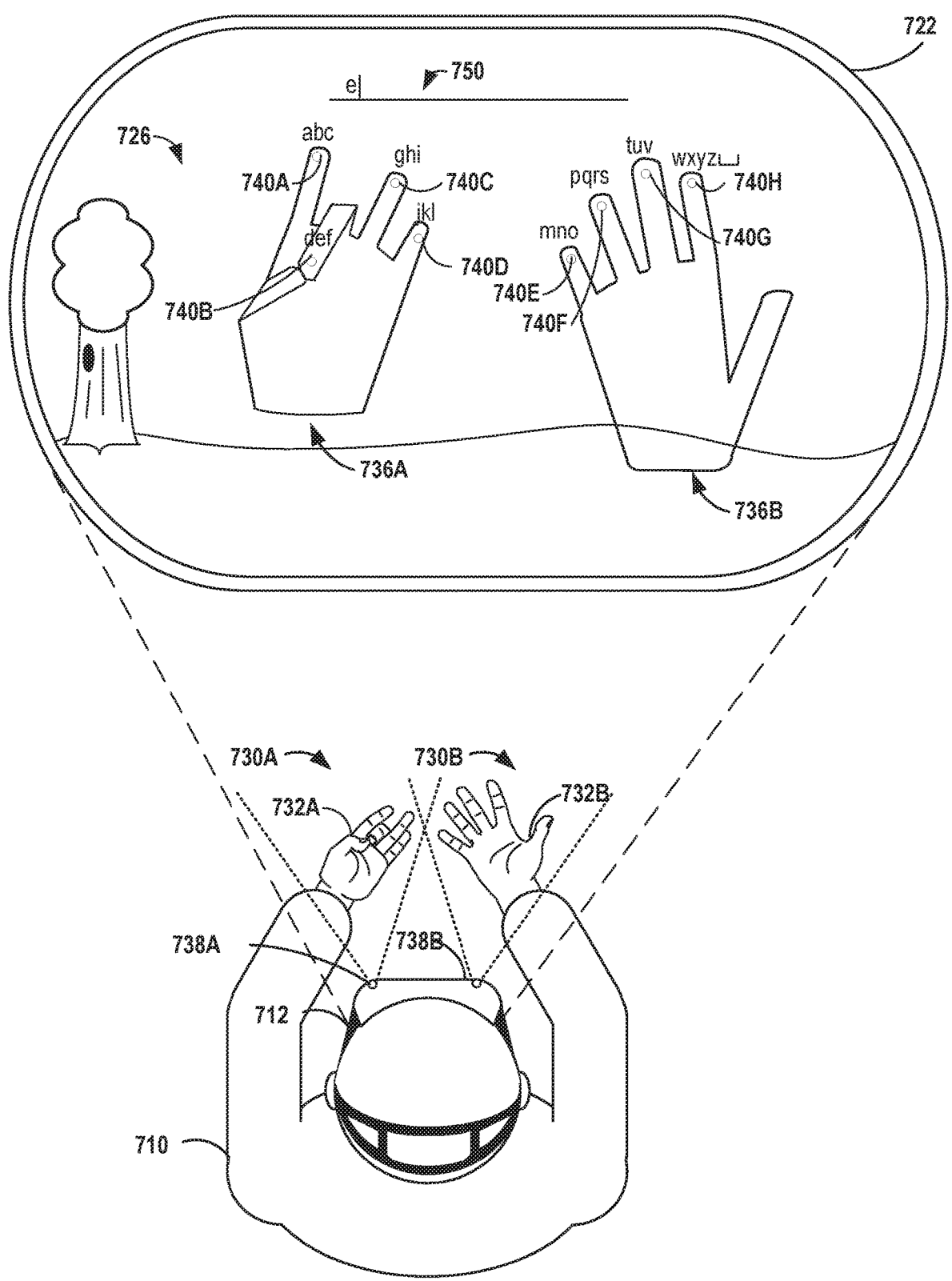

FIGS. 7A and 7B are illustrations depicting an example artificial reality system configured to detect a formation of a pinching configuration a particular number of times and to receive, as user input, an input character based on the particular digit involved in the pinching configuration and the particular number of times formation of the pinching configuration is detected, in accordance with the techniques of the disclosure. HMD 712 of FIG. 7 may be an example of any of HMDs 112 of FIGS. 1A and 1B. HMD 712 may be part of an artificial reality system, such as artificial reality systems 10, 20 of FIGS. 1A, 1B, or may operate as a stand-alone, mobile artificial realty system configured to implement the techniques described herein. While the below description describes HMD 712 performing various actions, a console connected to HMD 712, or particular engines within the console or HMD 712, may perform the various functions described herein. For instance, a rendering engine inside HMD 712 or a console connected to HMD 712 may perform the rendering operations, and a gesture detector inside HMD 712 or a console connected to HMD 712 may analyze image data to detect a motion of digits of hand 732A or 732B to form a pinching configuration in accordance with one or more of the techniques described herein.

In FIG. 7A, image capture devices 738A and 738B of HMD 712 capture image data representative of objects in the real world, physical environment that are within a fields of view 730A and 730B of image capture devices 738A and 738B. Fields of view 730A and 730B typically correspond with the viewing perspective of HMD 712. In some examples, such as the illustrated example of FIG. 7A, the artificial reality application renders the portions of hands 732A and 732B of user 710 that are within fields of view 730A and 730B as virtual hands 736A and 736B overlaid on top of background 726 within artificial reality content 722. In other examples, the artificial reality application may present a real-world image of hands 732A and 732B of user 710 within artificial reality content 722 comprising mixed reality and/or augmented reality. In either example, user 710 is able to view the portions of their hands 732A and 732B within fields of view 730A and 730B as objects within artificial reality content 722.

In the example of FIG. 7A, artificial reality content 722 also includes input character sets 740A-740H (collectively "input character sets 740"). In accordance with the techniques described herein, HMD 712 may detect hands 732A and 732B facing palm up in the image data captured by image capture devices 738A and 738B. HMD 712 may assign one of input character sets 740 to some of the digits of virtual hands 736A and 736B, leaving at least one digit (e.g., the thumbs of each of virtual hands 736A and 736B) without input characters assigned to them to be input selection digits for each of virtual hands 736A and 736B. HMD 712 may then render the specific input characters assigned to the respective digits of virtual hands 736A and 736B

In FIG. 7B, image capture devices 738A and/or 738B capture image data of hand 732A of user 710 performing a gesture that comprises a motion of a first digit and a second digit of hand 732A (e.g., the thumb and middle finger) to form a pinching configuration a particular number of times within a threshold period of time. Starting with the detection of the first pinching configuration, HMD 712 may detect that hand 732A forms the pinching configuration with the input selection digit (i.e., the thumb) and a digit assigned input character set 740B (i.e., the middle finger) two distinct times within the threshold amount of time (i.e., HMD 712 detects hand 732A forming the pinching configuration, releasing the pinching configuration, and then forming one subsequent pinching configuration). HMD 712 may determine that, based on the assigning of input character set 740B to the digit involved in the pinching configuration and the number of distinct times hand 732A formed the pinching configuration, the input character selected is the 'e' character. As such, HMD 712 may receive the selection of the 'e' character as user input. HMD 712 may then render and output, in artificial reality content 722, text field 750 to include the selected 'e' character. Though not shown, after HMD 712 detects formation of the first pinching configuration but before HMD 712 detects formation of the second pinching configuration, HMD 712 may render and output, in artificial reality content 722, text field 750 to include the 'd' character; replacing the 'd' character with the 'e' character upon detecting formation of the second pinching configuration of hand 732A.

Figure 8:
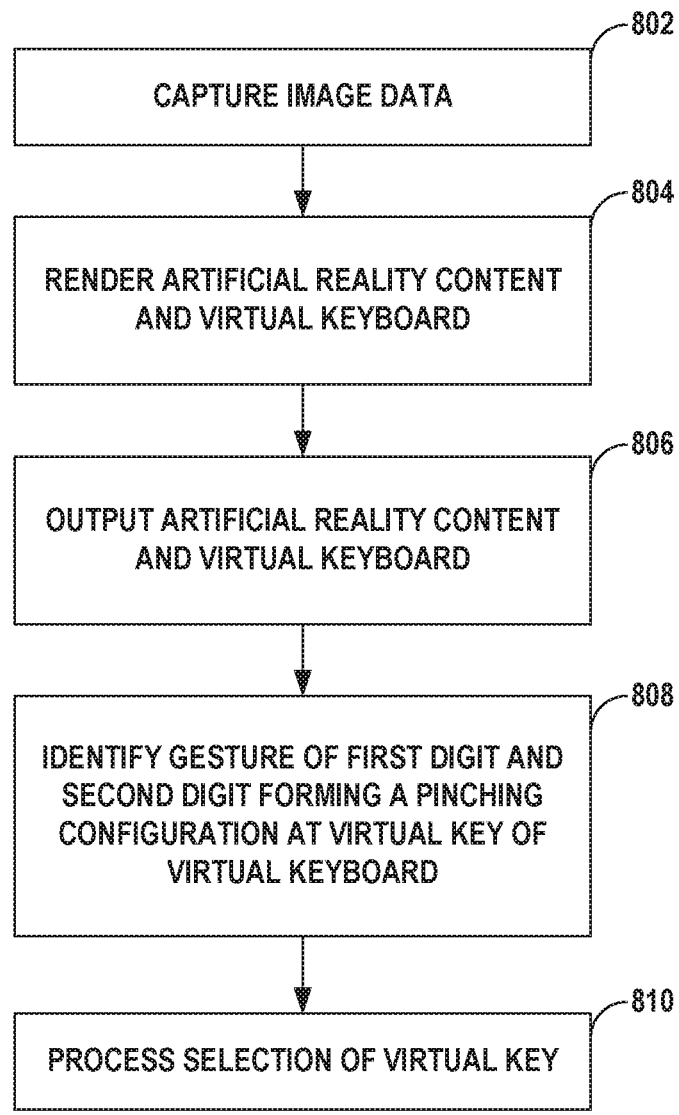
FIG. 8 is a flow diagram illustrating an example technique for an artificial reality system configured to output a virtual keyboard and to detect a formation of a pinching configuration at a location corresponding to a virtual key of the virtual keyboard, in accordance with the techniques described herein.

FIG. 8 is a flow diagram illustrating an example technique for an artificial reality system configured to output a virtual keyboard and to detect a formation of a pinching configuration at a location corresponding to a virtual key of the virtual keyboard, in accordance with the techniques described herein. The example operation may be performed by HMD 112, either alone or in conjunction with console 106, from FIG. 1. The following are steps of the process, although other examples of the process performed in accordance with the techniques of this disclosure may include additional steps or may not include some of the below-listed steps. While the below description describes HMD 112 performing various actions, a console (e.g., console 106) connected to HMD 112, or particular engines within console 106 or HMD 112, may perform the various functions described herein. For instance, a rendering engine inside HMD 112 or console 106 connected to HMD 112 may perform the rendering operations, and a gesture detector inside HMD 112 or console 106 connected to HMD 112 may analyze image data to detect a motion of digits of a hand forming a pinching configuration, in accordance with one or more of the techniques described herein.

In accordance with the techniques described herein, HMD 112, or other image capture devices (such as cameras 102 of FIG. 1B), captures image data representative of a physical environment (802). HMD 112 renders artificial reality content and a virtual keyboard with a plurality of virtual keys as an overlay to the artificial reality content (804). HMD 112 then outputs the artificial reality content and the virtual keyboard (806). HMD 112 identifies, from the image data, a gesture, the gesture including a motion of a first digit of a hand and a second digit of the hand to form a pinching configuration (808). A point of contact between the first digit and the second digit while in the pinching configuration corresponds to a location of a first virtual key of the plurality of virtual keys of the virtual keyboard. As such, HMD 112 processes a selection of the first virtual key in response to the identified gesture (810).

Figure 9:
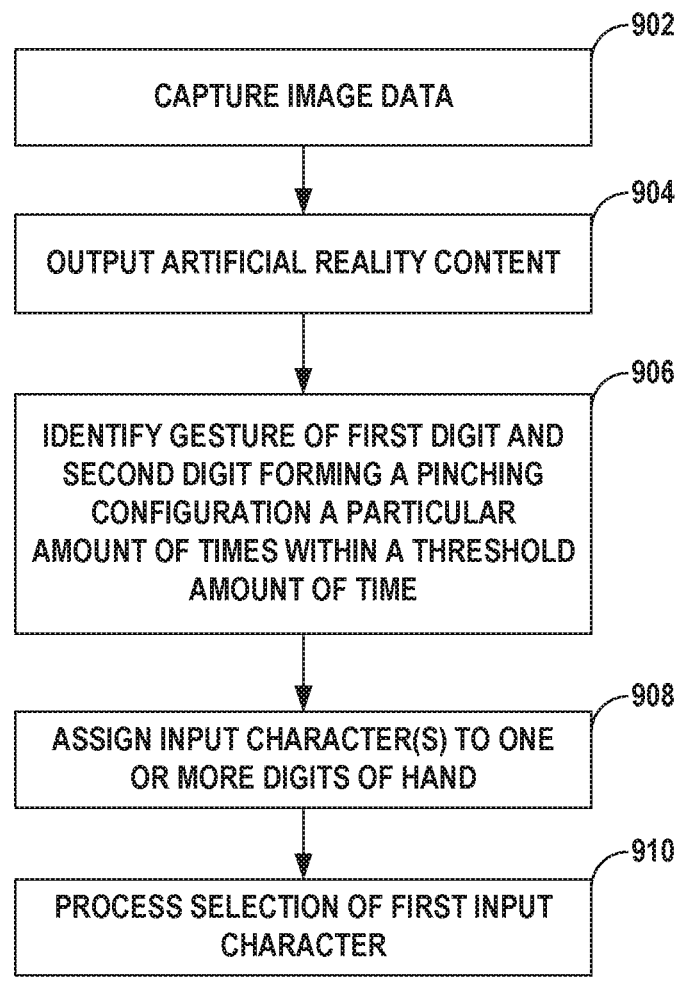
FIG. 9 is a flow diagram illustrating an example technique for an example artificial reality system configured to detect a formation of a pinching configuration a particular number of times and to receive, as user input, an input character based on the particular digit involved in the pinching configuration and the particular number of times formation of the pinching configuration is detected, in accordance with the techniques of the disclosure.

FIG. 9 is a flow diagram illustrating an example technique for an example artificial reality system configured to detect a formation of a pinching configuration a particular number of times and to receive, as user input, an input character based on the particular digit involved in the pinching configuration and the particular number of times formation of the pinching configuration is detected, in accordance with the techniques of the disclosure. The example operation may be performed by HMD 112, either alone or in conjunction with console 106, from FIG. 1. The following are steps of the process, although other examples of the process performed in accordance with the techniques of this disclosure may include additional steps or may not include some of the below-listed steps. While the below description describes HMD 112 performing various actions, a console (e.g., console 106) connected to HMD 112, or particular engines within console 106 or HMD 112, may perform the various functions described herein. For instance, a rendering engine inside HMD 112 or console 106 connected to HMD 112 may perform the rendering operations, and a gesture detector inside HMD 112 or console 106 connected to HMD 112 may analyze image data to detect a motion of digits of a hand forming a pinching configuration, in accordance with one or more of the techniques described herein.

In accordance with the techniques described herein, HMD 112, or other image capture devices (such as cameras 102 of FIG. 1B), captures image data representative of a physical environment (902). HMD 112 outputs artificial reality content (904). HMD 112 may identify, from the image data, a gesture, the gesture including a motion of a first digit of a hand and a second digit of the hand to form a pinching configuration a particular number of times within a threshold amount of time (906). HMD 112 assigns one or more input characters to one or more of a plurality of digits of the hand (908). HMD 112 processes a selection of a first input character of the one or more input characters assigned to the second digit of the hand in response to the identified gesture (910).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Various examples of the disclosure have been described. Any combination of the described systems, operations, or functions is contemplated. These and other examples are within the scope of the following claims.

What is claimed is:

1. An artificial reality system comprising:
    an image capture device configured to capture image data representative of a physical environment;
    a head-mounted display (HMD) configured to output artificial reality content;
    a gesture detector comprising processing circuitry configured to identify, from the image data, a gesture comprising a motion of a first digit of a hand and a second digit of the hand to form a pinching configuration a particular number of times within a threshold amount of time; and
    a user interface engine comprising processing circuitry configured to:
        assign one or more input characters to one or more of a plurality of digits of the hand, wherein the one or more input characters assigned to the second digit of the hand comprise a distinct set of input characters,
        map each of the one or more input characters in the distinct set of input characters assigned to the second digit of the hand to a respective selection number, wherein the respective selection number is less than or equal to a cardinality of the distinct set, and
        process a selection of a first input character of the one or more input characters in the distinct set of input characters assigned to the second digit of the hand based on the selection number mapped to the first input character in response to the particular number of times the pinching configuration is formed in the identified gesture.

2. The artificial reality system of claim 1, further comprising a rendering engine comprising processing circuitry configured to render the one or more input characters assigned to the one or more of the plurality of digits of the hand as an overlay to an image of the hand.

3. The artificial reality system of claim 1, wherein, to assign the one or more input characters, the user interface engine is configured to assign a distinct set of input characters to each digit of the one or more of the plurality of digits of the hand.

4. The artificial reality system of claim 3, wherein the hand comprises a first hand, and wherein the user interface engine is further configured to assign a distinct set of input characters to each digit of one or more of a plurality of digits of a second hand.

5. The artificial reality system of claim 1, wherein, to process the selection of the first input character, the user interface engine is configured to:
determine the selection of the first input character based on the selection number mapped to the first input character being equal to the particular number of times the first digit of the hand and the second digit of the hand form the pinching configuration within the threshold amount of time for the identified gesture.

6. The artificial reality system of claim 1, wherein, to process the selection of the first input character, the user interface engine is configured to:
calculate a quotient with a remainder by dividing the particular number of times the first digit of the hand and the second digit of the hand form the pinching configuration within the threshold amount of time for the identified gesture by the cardinality of the distinct set; and
determine the selection of the first input character based on the selection number mapped to the first input character being equal to the remainder.

7. The artificial reality system of claim 1, further comprising a rendering engine comprising processing circuitry configured to render, during the gesture, a current input character of the one or more input characters in the distinct set of input characters assigned to the second digit of the hand that would be selected based on a current number of times the first digit of the hand and the second digit of the hand form the pinching configuration within the threshold period of time.

8. The artificial reality system of claim 1, wherein the gesture comprises a first gesture,
wherein the gesture detector is further configured to identify, from the image data, a second gesture; and
wherein the user interface engine is configured to assign one or more special input characters to the second gesture, and process a selection of a first special input character of the one or more special input characters assigned to the second gesture in response to the identified second gesture.

9. The artificial reality system of claim 1, wherein the one or more input characters comprise one or more of letters, numbers, symbols, or a null character.

10. The artificial reality system of claim 1, wherein the image capture device is integrated within the HMD.

11. A method comprising:
capturing, by an image capture device of an artificial reality system, image data representative of a physical environment;
outputting, by head mounted display (HMD) of the artificial reality system, artificial reality content;
identifying, from the image data, a gesture comprising a motion of a first digit of a hand and a second digit of the hand to form a pinching configuration a particular number of times within a threshold amount of time;
assigning one or more input characters to one or more of a plurality of digits of the hand, wherein the one or more input characters assigned to the second digit of the hand comprise a distinct set of input characters;
mapping each of the one or more input characters in the distinct set of input characters assigned to the second digit of the hand to a respective selection number, wherein the respective selection number is less than or equal to a cardinality of the distinct set; and
processing a selection of a first input character of the one or more input characters in the distinct set of input characters assigned to the second digit of the hand based on the selection number mapped to the first input character in response to the particular number of times the pinching configuration is formed in the identified gesture.

12. The method of claim 11, further comprising rendering the one or more input characters assigned to the one or more of the plurality of digits of the hand as an overlay to an image of the hand.

13. The method of claim 11, wherein the hand comprises a first hand, and wherein assigning the one or more input characters comprises:
assigning a distinct set of input characters to each digit of the one or more of the plurality of digits of the first hand; and
assigning a distinct set of input characters to each digit of one or more of a plurality of digits of a second hand.

14. The method of claim 11, wherein processing the selection of the first input character comprises:
determining the selection of the first input character based on the selection number mapped to the first input character being equal to the particular number of times the first digit of the hand and the second digit of the hand form the pinching configuration within the threshold amount of time for the identified gesture.

15. The method of claim 11, wherein processing the selection of the first input character comprises:
calculating a quotient with a remainder by dividing the particular number of times the first digit of the hand and the second digit of the hand form the pinching configuration within the threshold amount of time for the identified gesture by the cardinality of the distinct set; and
determining the selection of the first input character based on the selection number mapped to the first input character being equal to the remainder.

16. The method of claim 11, further comprising rendering, during the gesture, a current input character of the one or more input characters in the distinct set of input characters assigned to the second digit of the hand that would be selected based on a current number of times the first digit of the hand and the second digit of the hand form the pinching configuration within the threshold period of time.

17. The method of claim 11, wherein the gesture comprises a first gesture, and wherein the method further comprises:
identifying, from the image data, a second gesture;
assigning one or more special input characters to the second gesture; and
processing a selection of a first special input character of the one or more special input characters assigned to the second gesture in response to the identified second gesture.

18. A non-transitory, computer-readable medium comprising instructions that, when executed, cause one or more processors of an artificial reality system to:
capture image data representative of a physical environment;
output artificial reality content;
identify, from the image data, a gesture comprising a motion of a first digit of a hand and a second digit of the hand to form a pinching configuration a particular number of times within a threshold amount of time;

assign one or more input characters to one or more of a plurality of digits of the hand, wherein the one or more input characters assigned to the second digit of the hand comprise a distinct set of input characters;

map each of the one or more input characters in the distinct set of input characters assigned to the second digit of the hand to a respective selection number, wherein the respective selection number is less than or equal to a cardinality of the distinct set; and process a selection of a first input character of the one or more input characters in the distinct set of input characters assigned to the second digit of the hand based on the selection number mapped to the first input character in response to the particular number of times the pinching configuration is formed in the identified gesture.

* * * * *